US012716828B2

(12) United States Patent
Tsujii et al.

(10) Patent No.: US 12,716,828 B2
(45) Date of Patent: Aug. 25, 2026

(54) SIGNAL PROCESSING METHOD, SIGNAL PROCESSING DEVICE, AND SIGNAL PROCESSING SYSTEM

(71) Applicant: HAMAMATSU PHOTONICS K.K., Hamamatsu (JP)

(72) Inventors: Kenta Tsujii, Hamamatsu (JP); Masato Asai, Hamamatsu (JP); Koji Takemiya, Hamamatsu (JP); Yoshiaki Yamauchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 84 days.

(21) Appl. No.: 18/836,246

(22) PCT Filed: Feb. 2, 2023

(86) PCT No.: PCT/JP2023/003471
§ 371 (c)(1),
(2) Date: Aug. 6, 2024

(87) PCT Pub. No.: WO2023/153316
PCT Pub. Date: Aug. 17, 2023

(65) Prior Publication Data

US 2025/0189430 A1 Jun. 12, 2025

(30) Foreign Application Priority Data

Feb. 9, 2022 (JP) ................................ 2022-018690

(51) Int. Cl.
*G01N 15/1429* (2024.01)
*G01N 15/10* (2024.01)
(Continued)

(52) U.S. Cl.
CPC ......... *G01N 15/1429* (2013.01); *G01N 21/53* (2013.01); *G01N 21/64* (2013.01); *G01N 2015/1006* (2013.01)

(58) Field of Classification Search
CPC ............... G01N 15/14; G01N 15/1429; G01N 15/1459; G01N 2015/1006; G01N 21/53; G01N 21/64
See application file for complete search history.

(56) References Cited

U.S. PATENT DOCUMENTS

2008/0319680 A1* 12/2008 Fox .................... H04B 17/0082 356/338
2012/0019825 A1* 1/2012 Thomas ............ G01N 15/1429 356/338

FOREIGN PATENT DOCUMENTS

JP H4-268453 A 9/1992
JP H5-209822 A 8/1993
(Continued)

OTHER PUBLICATIONS

Hayashi, Tatsuro, "Sensitivity and Noise in Photomultiplier Tubes," Applied Physics, Dec. 31, 1968, vol. 37, No. 9, p. 851, with partical English translation.
(Continued)

*Primary Examiner* — Hina F Ayub
(74) *Attorney, Agent, or Firm* — Faegre Drinker Biddle & Reath LLP

(57) ABSTRACT

The data processing device is a signal processing device that processes outputs of photomultiplier tubes configuring a flow cytometer system and includes a processor, in which the processor is configured to acquire intensity signals of the photomultiplier tubes based on signal light generated by flow cytometry using the flow cytometer system, calculate a virtual photon quantity of the signal light incident on the photomultiplier tubes by dividing a digital value of the
(Continued)

intensity signal by a gain of the photomultiplier tubes and signal light quantum efficiency, and execute data analysis based on the virtual photon quantity of the signal light.

17 Claims, 10 Drawing Sheets

(51) Int. Cl.
*G01N 21/53* (2006.01)
*G01N 21/64* (2006.01)

(56) References Cited

FOREIGN PATENT DOCUMENTS

| | | | | |
|---|---|---|---|---|
| JP | H9-204235 A | 8/1997 | | |
| JP | 2009-105024 A | 5/2009 | | |
| JP | 2009-210542 A | 9/2009 | | |
| JP | 2013-504051 A | 2/2013 | | |
| JP | 2013-246140 A | 12/2013 | | |
| JP | 2018-179709 A | 11/2018 | | |
| JP | 2019-502915 A | 1/2019 | | |
| JP | 2019-041724 A | 3/2019 | | |
| JP | 2020-137429 A | 9/2020 | | |
| WO | WO-2010019960 A2 | * | 2/2010 | ............... C12Q 1/06 |
| WO | WO-2011026942 A2 | * | 3/2011 | ......... G01N 15/1459 |
| WO | WO-2017/106439 A1 | | 6/2017 | |
| WO | WO-2019/049442 A1 | | 3/2019 | |

OTHER PUBLICATIONS

International Preliminary Report on Patentability mailed Aug. 22, 2024 for PCT/JP2023/003471.

International Preliminary Report on Patentability mailed Aug. 22, 2024 for PCT/JP2022/037165.

* cited by examiner (a)

(b)

SIGNAL PROCESSING METHOD, SIGNAL PROCESSING DEVICE, AND SIGNAL PROCESSING SYSTEM

TECHNICAL FIELD

One aspect of the embodiment relates to a signal processing method, a signal processing device, and a signal processing system.

BACKGROUND ART

Conventionally, flow cytometry has been known as a technique for counting, sorting, and characterizing a sample such as a cell using laser light. For example, Patent Literature 1 below discloses a flow cytometry system including a first sensor that is disposed in an axial direction with respect to a light source and senses a forward scattering component and a second sensor that is placed at a certain angle with respect to the first sensor and senses a side scattering component and/or a fluorescent component.

CITATION LIST

Patent Literature

Patent Literature 1: Japanese Unexamined Patent Publication No. 2013-504051

SUMMARY OF INVENTION

Technical Problem

In the conventional device as described above, an output signal from the sensor may fluctuate due to variations in detection characteristics of the sensor. In order to suppress the fluctuation of the output signal of the sensor, a setting parameter such as a supply voltage in the sensor can be adjusted, but in this case, light of the same incident intensity is detected as different output signal values depending on a degree of adjustment. As a result, different analysis results may occur depending on the degree of adjustment.

Therefore, one aspect of the embodiment has been made in view of such a problem, and an object thereof is to provide a signal processing method, a signal processing device, and a signal processing system capable of reducing variations in analysis results by flow cytometry.

Solution to Problem

A signal processing method according to a first aspect of an embodiment is a signal processing method for processing an output of a photomultiplier tube configuring a flow cytometer, the signal processing method including: acquiring an output current signal of the photomultiplier tube based on signal light generated by flow cytometry using the flow cytometer as a first current signal; calculating an analysis evaluation value that is either a photon quantity of the signal light incident on the photomultiplier tube or a photoelectron quantity emitted from a photoelectric conversion unit of the photomultiplier tube by dividing a value of the first current signal by a gain of the photomultiplier tube; and executing data analysis based on the analysis evaluation value.

Alternatively, a signal processing device according to a second aspect of the embodiment is a signal processing device that processes an output of a photomultiplier tube configuring a flow cytometer and includes a processor, in which the processor is configured to: acquire an output current signal of the photomultiplier tube based on signal light generated by flow cytometry using the flow cytometer as a first current signal, calculate an analysis evaluation value that is either a photon quantity of the signal light incident on the photomultiplier tube or a photoelectron quantity emitted from a photoelectric conversion unit of the photomultiplier tube by dividing a value of the first current signal by a gain of the photomultiplier tube, and execute data analysis based on the analysis evaluation value.

Alternatively, a signal processing system according to a third aspect of the embodiment includes the signal processing device; the photomultiplier tube; and an optical system that guides the signal light to the photomultiplier tube.

According to the first aspect, the second aspect, or the third aspect, the signal light generated using the flow cytometer is detected by the photomultiplier tube to acquire the first current signal, the analysis evaluation value that is the photon quantity of the signal light incident on the photomultiplier tube or the photoelectron quantity emitted from the photoelectric conversion unit of the photomultiplier tube is calculated from the value of the first current signal, and data analysis is executed based on the calculated analysis evaluation value. As a result, the signal light can be quantitatively analyzed, and variations in analysis results by flow cytometry can be reduced.

Advantageous Effects of Invention

According to any aspect of the present disclosure, it is possible to reduce variations in analysis results by flow cytometry.

DESCRIPTION OF EMBODIMENTS

Figure 1:
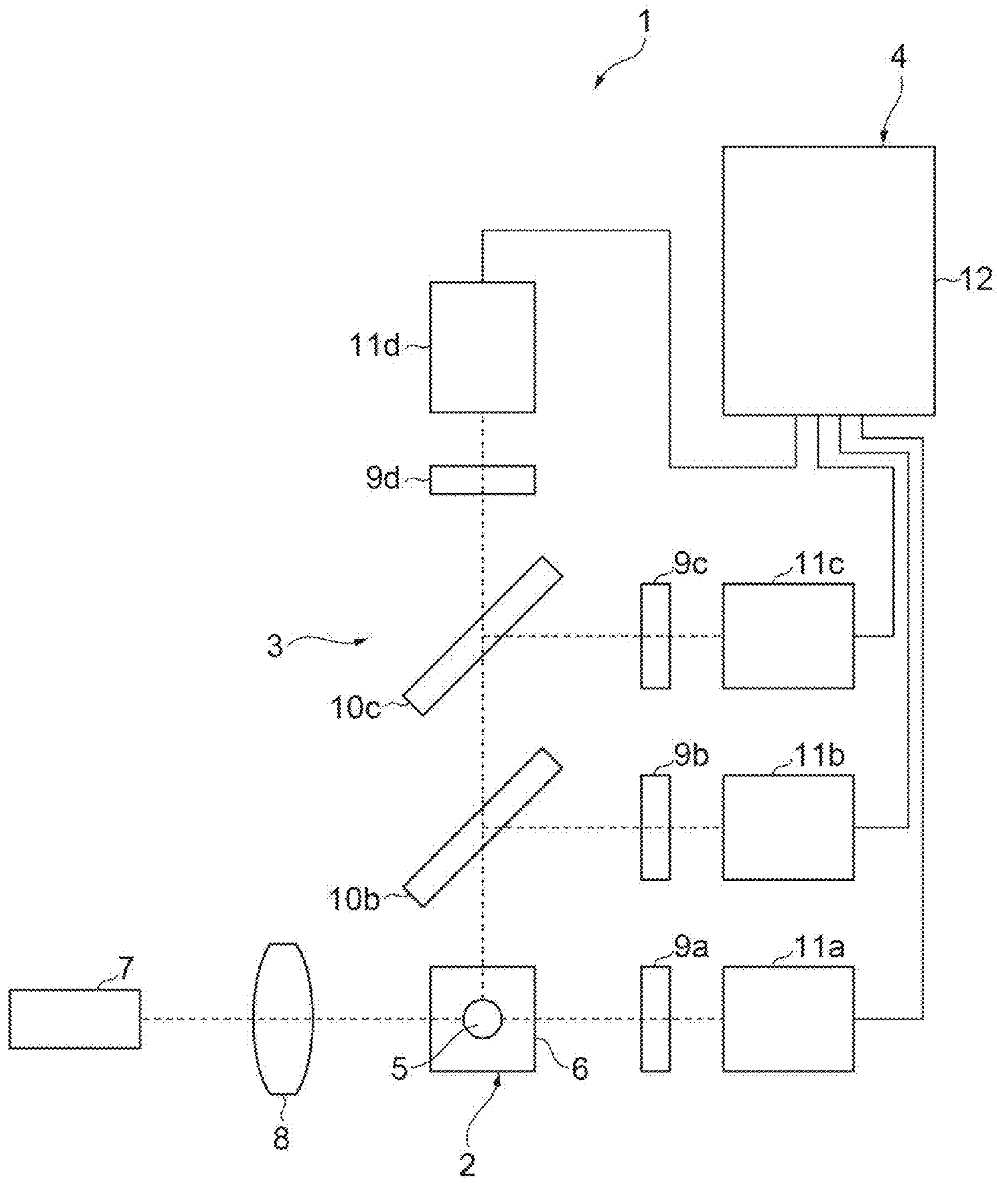
FIG. 1 is a schematic configuration diagram of a flow cytometer system 1 which is a flow cytometer according to an embodiment.

Hereinafter, the embodiment of the present invention will be described in detail with reference to the accompanying drawings. Note that in the description, the same reference numerals will be used for the same elements or elements having the same functions, and redundant description will be omitted.

FIG. 1 is a schematic configuration diagram of a flow cytometer system 1 which is a flow cytometer (signal processing system) according to the embodiment. The flow cytometer system 1 is a system for performing flow cytometry, and includes a fluid system 2, an optical system (optical system) 3, and an electronic system (signal processing device) 4.

The fluid system 2 is configured to include a flow cell 6 into which a sample fluid including an analyte such as a cell or a particle is injected and through which the analyte included in the sample fluid can be aligned and passed in a thin channel 5. The flow cell 6 is also provided with a function (not illustrated) of sorting (classifying and distributing) the gated analyte by electric field control or the like.

An optical system 3 is a system that optically analyzes the analyte passing through the flow cell 6 by flow cytometry. The optical system 3 includes a laser light source 7, a lens 8, filters 9*a*, 9*b*, 9*c*, and 9*d*, dichroic mirrors 10*b* and 10*c*, and photomultiplier tubes 11*a*, 11*b*, 11*c*, and 11*d*, and guides various types of light generated from the analyte by the flow cytometry to the photomultiplier tubes 11*a*, 11*b*, 11*c*, and 11*d*. The laser light source 7 is a light source device that generates laser light (excitation light) in a single wavelength band at a specific frequency, and the lens 8 focuses the laser light emitted from the laser light source 7 on the channel 5 in the flow cell 6. The filter 9*a* transmits forward scattered light generated from the sample fluid by irradiation with the laser light. The dichroic mirror 10*b* reflects side scattered light generated from the sample fluid by irradiation with laser light, and transmits fluorescence generated from the sample fluid. The dichroic mirror 10*c* reflects fluorescence in a first wavelength band out of the fluorescence transmitted through the dichroic mirror 10*b*, and transmits fluorescence in the remaining wavelength band out of the transmitted fluorescence. The filter 9*b* transmits the side scattered light reflected by the dichroic mirror 10*b*, and the filter 9*c* transmits first fluorescence of the first wavelength band reflected by the dichroic mirror 10*c*. The filter 9*d* transmits second fluorescence in a second wavelength band out of the fluorescence transmitted through the dichroic mirror 10*c*. The photomultiplier tubes 11*a*, 11*b*, 11*c*, and 11*d* are provided on optical axes of the forward scattered light, the side scattered light, the first fluorescence, and the second fluorescence, respectively, and measure the respective intensities of the forward scattered light, the side scattered light, the first fluorescence, and the second fluorescence.

An electronic system 4 includes a data processing device 12 and is a device for analyzing the intensity of light measured by the optical system 3. Specifically, the data processing device 12 is electrically coupled to the plurality of photomultiplier tubes 11*a*, 11*b*, 11*c*, and 11*d*, and executes data analysis for creating a histogram, a dot plot (also referred to as a cytogram), or the like based on an intensity signal 25 indicating intensity detected in each channel of the plurality of photomultiplier tubes 11*a*, 11*b*, 11*c*, and 11*d*, and executes gating processing. In addition, the data processing device 12 executes sorting (classification and distributing) on the analyte included in the sample fluid based on the gating processing.

Figure 2:
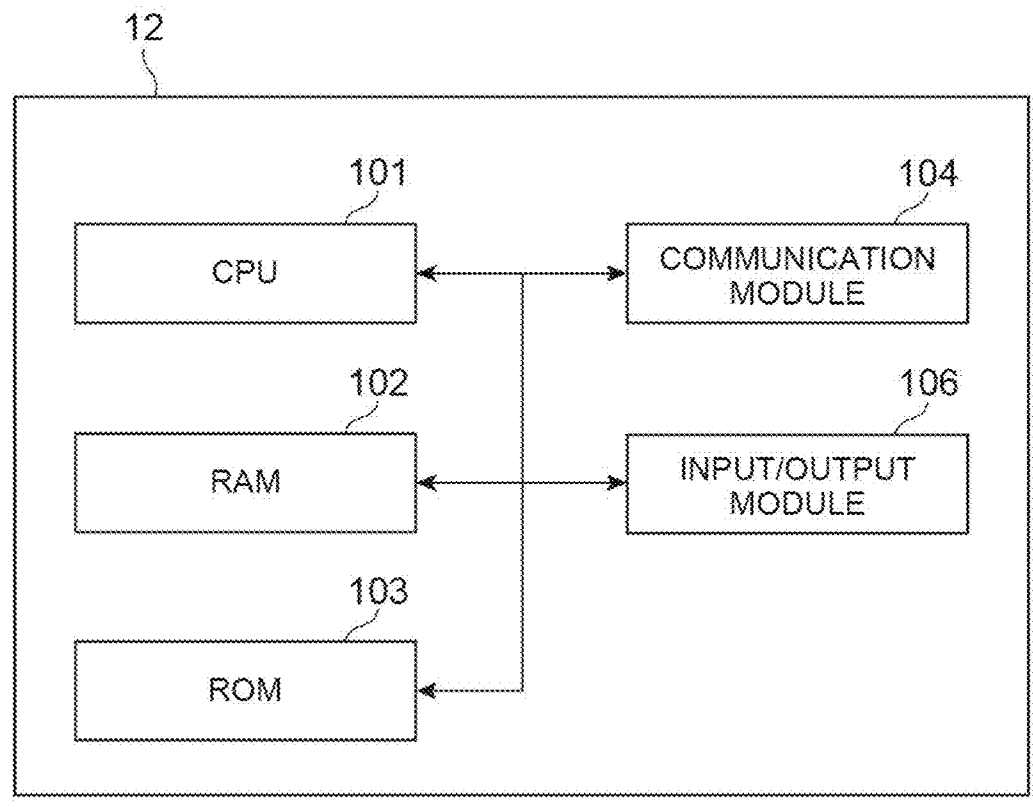
FIG. 2 is a block diagram illustrating an example of a hardware configuration of a data processing device 12 of FIG. 1.

Next, a configuration of the data processing device 12 will be described with reference to FIGS. 2 and 3. FIG. 2 is a block diagram illustrating an example of a hardware configuration of the data processing device 12, and FIG. 3 is a block diagram illustrating a functional configuration of the data processing device 12.

As illustrated in FIG. 2, the data processing device 12 is physically a computer or the like including a central processing unit (CPU) 101 that is a processor, a random access memory (RAM) 102 or a read only memory (ROM) 103 that is a recording medium, a communication module 104, an input/output module 106, and the like, which are electrically coupled to each other. Note that the data processing device 12 may include, as input/output devices, a display, a keyboard, a mouse, a touch panel display, or the like, or may include a data recording device such as a hard disk drive or a semiconductor memory. Furthermore, the data processing device 12 may include a plurality of computers.

Figure 3:
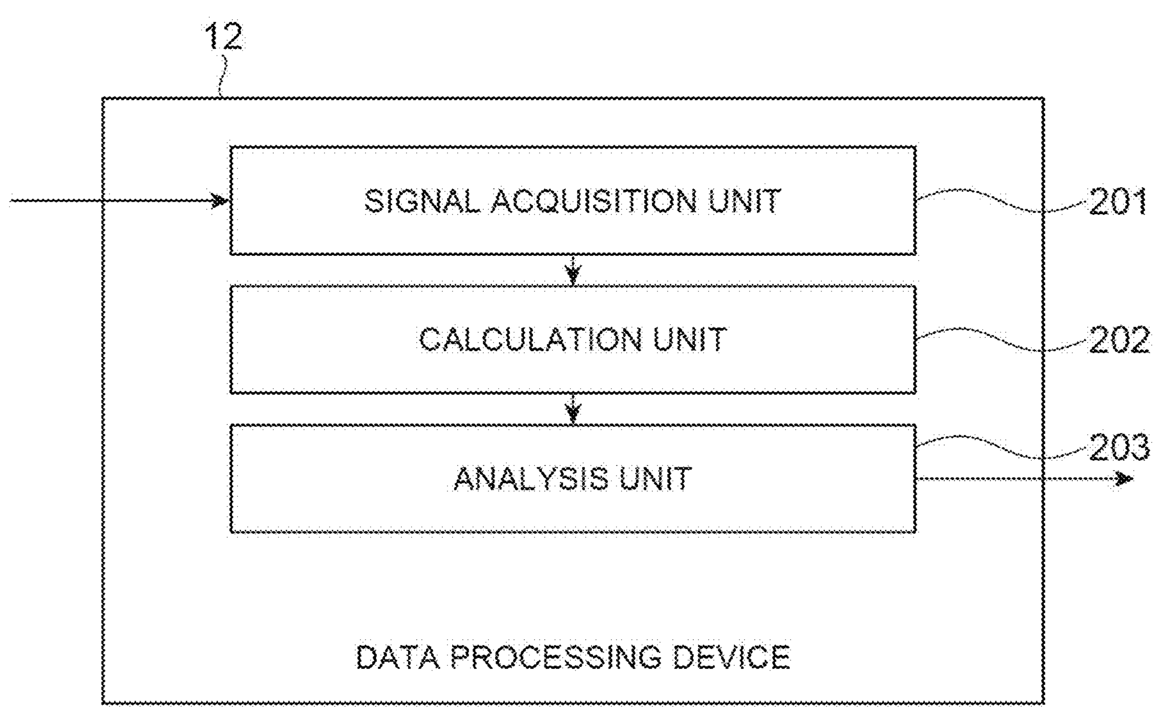
FIG. 3 is a block diagram illustrating a functional configuration of the data processing device 12.

As illustrated in FIG. 3, the data processing device 12 includes a signal acquisition unit 201, a calculation unit 202, and an analysis unit 203 as functional components. Each functional unit of the data processing device 12 illustrated in FIG. 3 is realized by operating the communication module 104, the input/output module 106, and the like and reading and writing data in the RAM 102 under the control of the CPU 101 by reading a program on hardware such as the CPU 101 and the RAM 102. The CPU 101 of the data processing device 12 causes each functional unit in FIG. 3 to function by executing a program, and sequentially executes processing corresponding to a signal processing method to be described later. Note that the CPU 101 may be a single piece of hardware or may be implemented in programmable logic such as an FPGA like a software processor. The RAM or the ROM may be a single piece of hardware or may be built in a programmable logic such as an FPGA. Various types of data necessary for execution of the program and various types of data generated by execution of the program are all stored in an internal memory such as the ROM 103 and the RAM 102 or a recording medium such as a hard disk drive. Hereinafter, functions of functional components of the data processing device 12 will be described in detail.

The signal acquisition unit 201 acquires an intensity signal (output current signal) output from each channel of the plurality of photomultiplier tubes 11*a*, 11*b*, 11*c*, and 11*d*. The intensity signal to be acquired is an analog signal obtained by detecting, in each photomultiplier tube, a current due to multiplied electrons corresponding to the intensity of signal light such as forward scattered light, side scattered light, or fluorescence generated by flow cytometry. The signal acquisition unit 201 converts the acquired intensity signal of each channel into a digital value DN and outputs the digital value DN to the calculation unit 202. Note that the A/D conversion function of the signal acquisition unit 201 may be realized by an external circuit unit of the data processing device 12.

The calculation unit 202 executes calculation to convert the digital value DN of each channel output from the signal acquisition unit 201 into a virtual photon quantity (photon quantity) which is an index (analysis evaluation value) according to the real photon quantity (photon) incident on each channel. Here, prior to the description of the calculation function by the calculation unit 202, a theoretical model of the intensity of the signal light and the noise examined by the inventors of the present application will be described.

According to the examined theoretical model, an average value $A_S$ [DN: digital number] of the intensity signals and noise $\sigma_{this}$ (standard deviation) [DN rms] of the intensity signal are represented by the following Formulas (1) and (2).

[Formula 1]

$$A_s = A_o + C*G*(D + Q_B*B + Q_S*S) \tag{1}$$

[Formula 2]

$$\sigma_{this} = \sqrt{(\sigma_C)^2 + \left(C*\sqrt{F}*G*\sqrt{D+Q_B*B}\right)^2 + \left(C*\sqrt{F}*G*\sqrt{Q_S*S}\right)^2 + (C*\rho*G*Q_S*S)^2} \tag{2}$$

Here, among the parameters in the above formula, those mainly related to an expectation value are represented by capital alphabets, and those mainly related to the noise are represented by lowercase Greek letters. $\sigma_C$ indicates the noise [DN rms] generated by a circuit (hereinafter, simply referred to as an "A/D conversion circuit") having a function of transmitting an intensity signal and converting the intensity signal into a digital value between the output of the photomultiplier tube of each channel and the signal acquisition unit 201 of the data processing device 12 in the flow cytometer system 1, C indicates a conversion coefficient [DN/e] of the digital value DN with respect to the electron quantity output by the photomultiplier tube in the A/D conversion circuit, F indicates an index (excess noise coefficient) indicating a degree of multiplication fluctuation of the photomultiplier tube having a multiplication mechanism, G indicates a multiplication factor (gain) of the photomultiplier tube, that is, a ratio [e/e] of the output electron quantity with respect to the input electron quantity, and D indicates an effective electron quantity expectation value [e] of a dark current of the photomultiplier tube. The effective value means a value calculated by excluding a component that can be ignored in statistical calculation from the intensity signal output from the photomultiplier tube (the same applies hereinafter). In addition, $Q_B$ indicates photon-to-electron conversion efficiency of the photomultiplier tube (background light quantum efficiency) [e/photon] according to the wavelength spectrum of the background light incident on the photomultiplier tube, and B indicates an expectation value of an index according to a virtual photon quantity in the amount of incident light of the background light incident on the photomultiplier tube (virtual photon quantity expectation value of background light) [photon]. The "virtual photon quantity" means a value relatively indicating the actual photon quantity with quantitatively maintained (the same applies hereinafter). In addition, $Q_S$ indicates photon-to-electron conversion efficiency (signal light quantum efficiency) [e/photon] of the photomultiplier tube according to the wavelength spectrum of the signal light incident on the photomultiplier tube, S indicates an expectation value (virtual photon quantity expectation value of signal light) [photon] of an index according to the photon quantity in the amount of incident light of the signal light incident on the photomultiplier tube, p indicates a value (variation rate on the light source and sample side) indicating the degree of variations of the signal light generated before the incidence on the photomultiplier tube due to the laser light source 7, the sample fluid, or the like by a ratio to the expectation value of the amount of signal light, and $A_0$ indicates a value (offset) [DN] indicating an inherent offset of the A/D conversion circuit.

In the above Formulas (1) and (2), $Q_B$*B indicates an effective photoelectron quantity [e] of the background light incident on the photomultiplier tube, and $Q_S$*S indicates an effective photoelectron quantity [e] of the signal light incident on the photomultiplier tube. These values are treated as basic physical quantities in the examined theoretical model as well as the effective electron quantity expectation value D of the dark current in the above Formulas (1) and (2). The effective photoelectron quantity here means a value calculated by excluding a component that can be ignored in statistical calculation from the photoelectron quantity emitted from the photoelectric conversion unit according to the light incident on the photomultiplier tube (the same applies hereinafter).

As a factor of the change in the value of the variation rate p on the light source and sample side, there are mainly a variation due to a hitting way of the laser light to the analyte such as cells flowing through the channel 5 in the flow cell 6 of the flow cytometer system 1 and a variation generated for each analyte. The variation due to the hitting way of the laser light includes a variation in the hitting way of the laser light to the channel 5 and a spatial variation in the analyte flowing in the channel 5. In addition, the variation for each analyte includes a variation in the size of the analyte and a variation in the content of a molecule or molecular structure to be measured present in the analyte. Factors that substantially affect the variation rate p include a variation in the light amount with time in the laser light source 7 itself, a variation due to the hitting way of the laser light to the channel 5, a variation with time in a flow rate in the channel 5, a spatial variation in the analyte in the channel 5, a variation in the size of the analyte, a variation in the content of the molecule or molecular structure present in the analyte, a spatial variation in the content of the molecule or molecular structure present in the analyte, a variation in a binding rate between the molecule or molecular structure and a staining phosphor, a variation in luminous efficiency of the staining phosphor, a variation due to foreign matters other than the analyte flowing through the channel 5, and the like.

In the above Formula (2), a first term and a second term in a square root are terms that do not depend on a parameter S that is the virtual photon quantity expectation value of the signal light but mainly change due to the circuit noise including the noise of the A/D conversion circuit or the background light and the dark current, a third term in the square root is a term that mainly changes due to the noise (shot noise) generated in the process of converting the photon to the electron depending on a square root $S^{1/2}$ of the parameter S, and a fourth term in the square root is a term that mainly changes due to the variation on the light source and sample side depending on the parameter S. From this Formula, it has been clarified that in a case where the intensity of the signal light is relatively low, the tendency of the noise of the intensity signal can be evaluated in consideration of the effects of the first to third terms, but in a case where the intensity of the signal light is high, the tendency of the noise of the intensity signal cannot be evaluated without considering the effect of the fourth term.

A known conversion coefficient C, a known gain G, and known signal light quantum efficiency $Q_S$ among the parameters for each channel are input to the data processing device 12 by a user and stored in advance in an internal recording medium such as the RAM 102. The calculation unit 202 calculates a virtual photon quantity corresponding to the signal light detected in each channel as follows using the parameters stored for each channel.

That is, the calculation unit 202 stops detection by the flow cytometry, acquires the digital values DN of the intensity signal (output current signal) output from the photomultiplier tube for a plurality of events in a state where no signal light is incident on the photomultiplier tube, and calculates and acquires an average value (first average value) $A_{S=0}$ and a standard deviation (second noise value) $\sigma_{S=0}$ of the digital values DN. The calculated average value $A_{S=0}$ and standard deviation $\sigma_{S=0}$ are approximated to values indicated in the following Formulas (3) and (4) by applying the theoretical formulas of the Formulas (1) and (2).

[Formula 3]

$$\sigma_{S=0} = \sqrt{(\sigma_C)^2 + \left(C * \sqrt{F} * G * \sqrt{D + Q_B * B}\right)^2} \quad (3)$$

[Formula 4]

$$A_{S=0} = A_0 + C * G * (D + Q_B * B) \quad (4)$$

Then, the calculation unit 202 stores the calculated parameters $A_{S=0}$ and $\sigma_{S=0}$ in the internal recording medium.

In addition, the calculation unit 202 starts detection by the flow cytometry on the sample fluid to be measured in a state where the intensity of the signal light is sufficiently high by a method such as changing the intensity of the laser light to a predetermined intensity, using beads or a staining phosphor having an appropriate amount of emitted light, or mounting a calibration light source on the flow cytometer side, acquires digital values DN of the intensity signals (output current signals) output from the photomultiplier tube for a plurality of events, and calculates and acquires an average value (second average value) $A_{S>>H}$ and a standard deviation (third noise value) $\sigma_{S>>H}$ of the digital values DN. The intensity of the laser light, the beads, the staining phosphor, or the calibration light source is determined according to an upper limit value of the light amount emitted by the analyte, an input upper limit voltage of the signal processing circuit, or the like. The calculated standard deviation $\sigma_{S>>H}$ and the average value $A_{S>>H}$ approximate values as indicated in the following Formulas (5) and (6) when the theoretical formulas of the Formulas (1) and (2) are applied. Therefore, the calculation unit 202 can calculate the variation rate p using the following Formula (7) based on the average value $A_{S>>H}$ and the standard deviation $\sigma_{S>>H}$.

[Formula 5]

$$\sigma_{S\gg H} = \sqrt{(C * \rho * G * Q_S * S)^2} \quad (5)$$

[Formula 6]

$$A_{S\gg H} = C * G * Q_S * S \quad (6)$$

[Formula 7]

$$\rho = \frac{\sigma_{S\gg H}}{A_{S\gg H}} \quad (7)$$

Then, the calculation unit 202 stores the calculated parameter p in the internal recording medium.

In addition, the calculation unit 202 starts detection by the flow cytometry on the sample fluid to be measured in each of the states in which the intensity of the signal light is changed to two types of high and low by changing the intensity of the laser light to two types, using two types of beads or staining phosphors that have an appropriate amount of emitted light again, mounting a calibration light source that emits two types of light amounts on the flow cytometer side, or dimming a state in which the light amount is sufficiently large using an ND filter, and acquires digital values DN of intensity signals (output current signals) output from the photomultiplier tube in each state for a plurality of events. Furthermore, the calculation unit 202 calculates and acquires an average value $A_H$ and a standard deviation on of the digital values DN when the light amount incident on the photomultiplier tube is high, and an average value $A_L$, and a standard deviation or, of the digital values DN when the light amount incident on the photomultiplier tube is low. In addition, the calculation unit 202 calculates an excess noise coefficient F using the following Formula (8) based on the average values $A_H$ and $A_L$, the standard deviations $\sigma_H$ and $\sigma_L$, and the average value $A_{S=0}$.

[Formula 8]

$$F = \left\{\frac{\sigma_H^2 - \sigma_L^2}{A_H - A_L} - \rho^2 * (A_H + A_L - 2 * A_{S=0})\right\} * \frac{1}{C * G} \quad (8)$$

Then, the calculation unit 202 stores the calculated parameter F in the internal recording medium.

With reference to the parameters for each channel stored as described above, the calculation unit 202 starts detection of the sample fluid to be measured by the flow cytometry in a state where the intensity of the laser light is set to a predetermined value suitable for measurement, and acquires the digital value DN of the intensity signal (first current signal) output from the photomultiplier tube of each channel. Further, the calculation unit 202 refers to the stored parameters of each channel and calculates the following Formula (9) to derive a virtual photon quantity S from the average value $A_S$ of the intensity signals indicated by the digital values DN.

[Formula 9]

$$S = \frac{A_s - \{A_0 + C * G * (D + Q_B * B)\}}{C * G * Q_S} = \frac{A_s - A_{S=0}}{C * G * Q_S} \quad (9)$$

That is, the calculation unit 202 subtracts the average value $A_{S=0}$ from the average value $A_S$ of the intensity signals, and divides the subtracted value by the conversion coefficient C, the gain G, and the signal light quantum efficiency $Q_S$, thereby calculating the virtual photon quantity S of the signal light incident on the photomultiplier tube.

In addition, the calculation unit 202 derives a standard deviation (first noise value) $\sigma_{this}$ of the intensity signals indicated by the digital values DN by referring to the virtual photon quantity S calculated as described above and the stored parameters of each channel. Specifically, the calculation unit 202 calculates the standard deviation (first noise value) $\sigma_{this}$ by adding a value calculated by the conversion coefficient C, the gain G, the signal light quantum efficiency $Q_S$, the variation rate p, the excess noise coefficient F, and the virtual photon quantity S to a value obtained by squaring the standard deviation $\sigma_{S=0}$ and obtaining a square root of the added value using the following Formula (10). Thereafter, the calculation unit 202 can convert the standard deviation $\sigma_{this}$ [DN rms] into a standard deviation $\sigma_{this}$ [photon rms] obtained by converting the standard deviation $\sigma_{this}$ [DN rms] into a virtual photon quantity by dividing the standard deviation $\sigma_{this}$ by the conversion coefficient C, the gain G, and the signal light quantum efficiency $Q_S$.

[Formula 10]

$$\sigma_{this} = \sqrt{\left\{\sqrt{(\sigma_C)^2 + \left(C * \sqrt{F} * G * \sqrt{D + Q_B * B}\right)^2}\right\}^2 + C^2 * G^2 * Q_S * \left(F * S + \rho^2 * Q_S * S^2\right)} = \sqrt{\sigma_{S=0}^2 + C^2 * G^2 * Q_S * \left(F * S + \rho^2 * Q_S * S^2\right)} \tag{10}$$

The analysis unit 203 executes data analysis based on the data of the virtual photon quantity S for each channel and the standard deviation this for each channel calculated by the calculation unit 202. Specifically, a histogram and a dot plot are generated based on the virtual photon quantity S of the plurality of channels, and are output to the input/output device. In addition, the analysis unit 203 performs gating processing on the generated dot plot, and defines a boundary of different populations of analytes. Furthermore, by controlling the fluid system 2, the analysis unit 203 can also cause the fluid system 2 to execute sorting processing for classifying and distributing the population based on the boundary of the population of the analyte.

Figure 4:
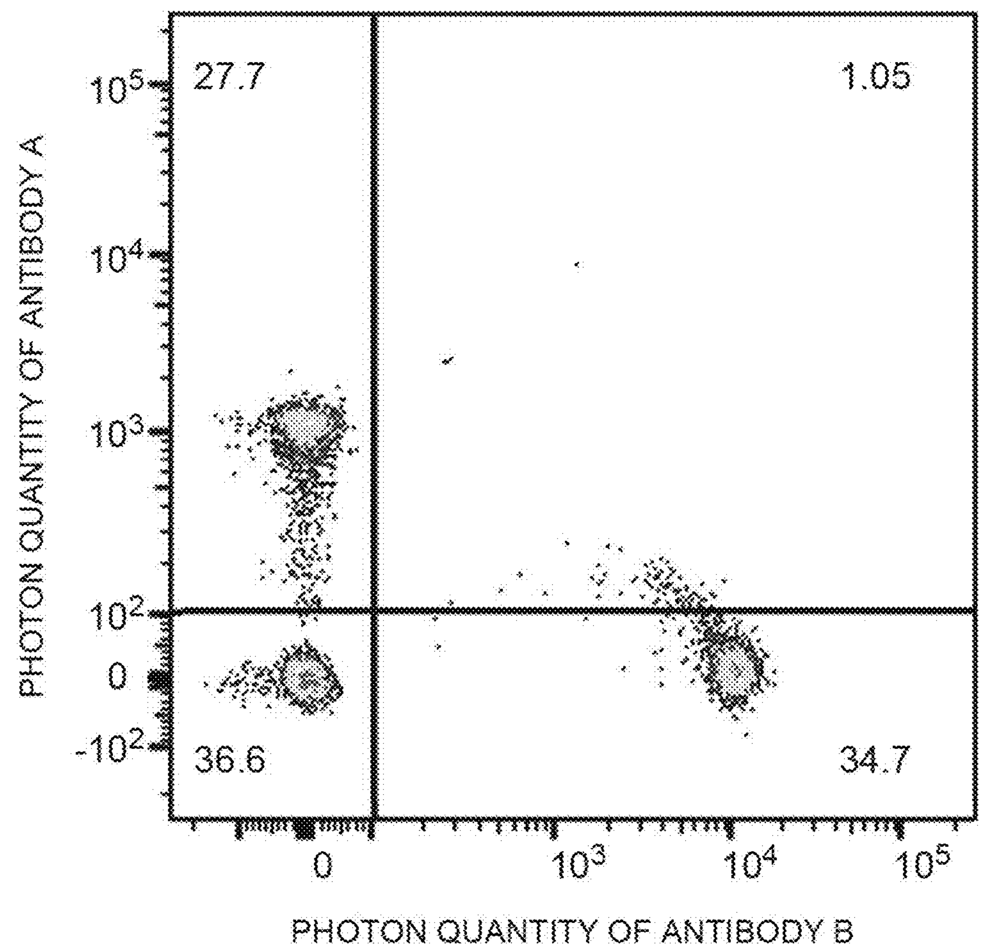
FIG. 4 is a graph illustrating an example of a dot plot generated and output in data analysis by an analysis unit 203 in FIG. 3.
Figure 5:
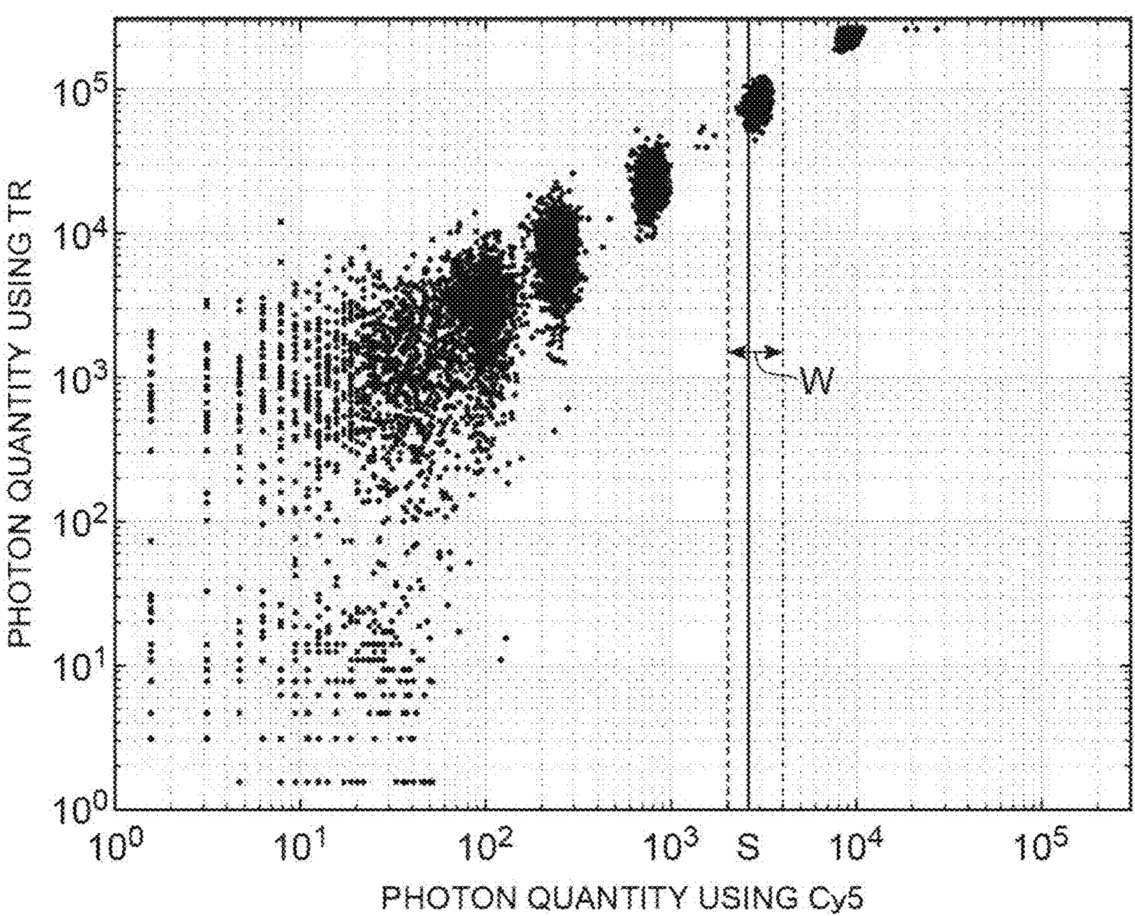
FIG. 5 is a graph illustrating an example of the dot plot generated and output in the data analysis by the analysis unit 203 in FIG. 3.

FIGS. 4 and 5 are graphs illustrating examples of dot plots generated and output in the data analysis by the analysis unit 203. FIG. 4 illustrates a dot plot obtained by plotting a relationship between a virtual photon quantity of a fluorescent channel corresponding to an antibody A and a virtual photon quantity of a fluorescent channel corresponding to an antibody B, and a boundary defined by the gating processing is illustrated by a solid line. In this way, a ratio of the population in the entire analyte to be detected is calculated and output by the gating processing, and "36.6%" that is a ratio of the population in which both the antibody A and the antibody B are negative, "34.7%" that is a ratio of the population in which only the antibody B is positive, "27.7%" that is a ratio of the population in which only the antibody A is positive, and "1.05%" that is a ratio of both the antibodies A and B are positive are output. FIG. 5 illustrates a dot plot obtained by plotting a relationship between a virtual photon quantity of a fluorescent channel using a fluorescent pigment Cy5 and a virtual photon quantity of a fluorescent channel using a fluorescent pigment TR. In this manner, when the boundary of the population is defined by the gating processing, it is possible to automatically define the boundary of a range W of a gate section determined by the standard deviation $\sigma_{this}$ corresponding to an average value S, centered on the average value S of the virtual photon quantity of the population. The range W determined by the standard deviation $\sigma_{this}$ is set to, for example, a range in which the virtual photon quantity is $S \pm 3 \times \sigma_{this}$.

Figure 6:
FIG. 6 is a flowchart illustrating a procedure of a signal processing method according to the embodiment.
Figure 7:
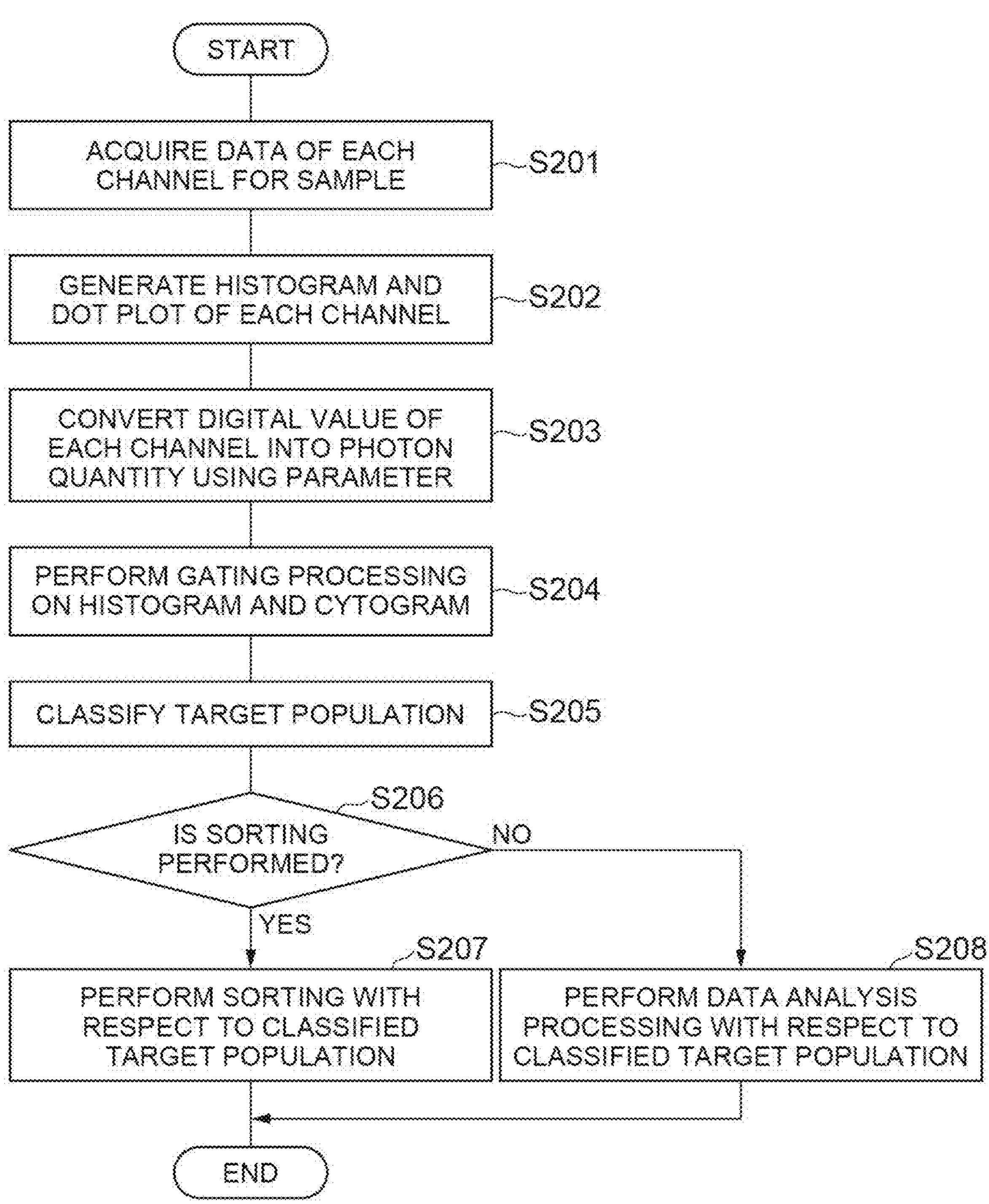
FIG. 7 is a flowchart illustrating the procedure of the signal processing method according to the embodiment.

Next, a procedure of a method of processing an output signal of the photomultiplier tube using the flow cytometer system 1 will be described with reference to FIGS. 6 and 7. FIG. 6 illustrates preliminary preparation processing of the parameters for each channel by the flow cytometer system 1, and FIG. 7 illustrates analysis processing by the flow cytometry on the sample fluid.

First, referring to FIG. 6, a known conversion coefficient C, a known gain G, and known signal light quantum efficiency $Q_S$ among the parameters for each channel are input to the data processing device 12 by the user (step S101). Thereafter, in a state where the signal light is not incident on each channel in the flow cytometer system 1, the data processing device 12 acquires data of the digital value DN of each channel for a plurality of events (step S102). Then, in the data processing device 12, the parameters $A_{S=0}$ and $\sigma_{S=0}$ of each channel are acquired and stored (step S103).

Next, the data processing device 12 detects the signal light on the sample fluid to be measured in a state where the intensity of the signal light is sufficiently high by a method such as changing the laser light to a predetermined intensity in the flow cytometer system 1, using beads or a staining phosphor having an appropriate amount of emitted light, or mounting a calibration light source on the flow cytometer side, whereby the data of the digital value DN of each channel is acquired for a plurality of events (step S104). Then, in the data processing device 12, the parameter $\rho$ of each channel is acquired and stored (step S105).

Furthermore, in the flow cytometer system 1, the intensity of the laser light is changed to two types, two types of beads or fluorescent pigments having an appropriate amount of emitted light are used, two types of light amount calibration light sources are used, or two types of ND filters are used at a sufficiently bright state, and in a state where the intensity of the signal light is changed to two types of high and low, the data processing device 12 detects the signal light for the sample fluid to be measured, so that the data of the digital value DN of each channel is acquired for a plurality of events (step S106). Then, in the data processing device 12, the parameter F of each channel is acquired and stored (step S107). Thus, the preliminary preparation processing is completed.

Referring to FIG. 7, detection of the sample fluid to be measured by the flow cytometry is started in a state where the intensity of the laser light is set to a predetermined value suitable for measurement in the flow cytometer system 1, and accordingly, data of the digital value DN of each channel is acquired by the data processing device 12 (step S201). Next, the data processing device 12 generates a histogram and a dot plot of each channel by using the digital value DN of each channel (step S202). At that time, the data processing device 12 refers to the stored parameters $A_{S=0}$, $\sigma_{S=0}$, $\rho$, and F of each channel, converts the digital value DN of each channel into a virtual photon quantity S, and calculates a standard deviation $\sigma_{this}$ corresponding to the virtual photon quantity S (step S203).

Thereafter, the data processing device 12 performs gating processing using the calculated virtual photon quantity S and the standard deviation $\sigma_{this}$ on the generated histogram and the dot plot (step S204). Then, the data processing device 12 classifies a population (target population) of the analyte in the data indicated by the histogram and the dot plot based on the result of the gating processing (step S205).

Next, in a case where sorting is set to be executed in the data processing device 12 (step S206; Yes), the data processing device 12 executes control such that sorting is performed on the classified target population (S207). On the other hand, in a case where sorting is set not to be executed in the data processing device 12 (step S206; No), the data processing device 12 performs data analysis processing such as calculation of a ratio of the classified target population to the entire population (S208).

The operational effects of the flow cytometer system 1 according to the embodiment described above will be described.

In the flow cytometer system 1 according to the present embodiment, the signal light generated in each channel is detected by the photomultiplier tubes 11*a*, 11*b*, 11*c*, and 11*d* to acquire the intensity signal, the virtual photon quantity S of the signal light incident on the photomultiplier tubes 11*a*, 11*b*, 11*c*, and 11*d* is calculated from the digital value DN of the intensity signal, and data analysis is executed based on the calculated virtual photon quantity S of the signal light. As a result, the signal light can be quantitatively analyzed, and variations in analysis results by flow cytometry can be reduced. In particular, in the present embodiment, since the virtual photon quantity is used as the analysis evaluation value, it is possible to reduce variations in analysis results by the flow cytometry between different devices.

In addition, the data processing device 12 according to the present embodiment executes gating processing of defining a boundary of a population to be analyzed as data analysis. As a result, the gating processing can be performed based on the quantitative intensity information of the signal light, and the accuracy of the population identification of the analysis target can be enhanced.

Furthermore, in the data processing device 12 according to the present embodiment, the standard deviation $\sigma_{this}$ corresponding to the noise included in the virtual photon quantity S is calculated from the calculated virtual photon quantity S of the signal light, and the gate section is set using the standard deviation $\sigma_{this}$ in the gating processing. As a result, the accuracy of the population identification of the analysis target can be further enhanced.

Furthermore, the data processing device 12 according to the present embodiment acquires the average value $A_{S=0}$ of the digital values DN of the intensity signals of the photomultiplier tubes 11*a*, 11*b*, 11*c*, and 11*d* in a case where there is no incidence of the signal light in the flow cytometer system 1, and calculates the virtual photon quantity S of the signal light using the average value $A_S$ obtained by subtracting the average value $A_{S=0}$. In this way, the virtual photon quantity S of the signal light can be calculated excluding the influence of the background light and the dark current. As a result, the reliability of the analysis result by the flow cytometry can be enhanced.

In addition, the data processing device 12 according to the present embodiment acquires the standard deviation $\sigma_{S=0}$ of the digital values DN of the intensity signals of the photomultiplier tubes 11*a*, 11*b*, 11*c*, and 11*d* when there is no incidence of the signal light in the flow cytometer system 1, and calculates the standard deviation $\sigma_{this}$ by further using the standard deviation $\sigma_{S=0}$. In this way, the noise component of the virtual photon quantity of the signal light can be calculated in consideration of the influence of the background light and the dark current. As a result, the accuracy of the population identification of the analysis target can be further enhanced.

In addition, the data processing device 12 according to the present embodiment acquires the average value $A_{S>>H}$ of the digital values DN of the intensity signals of the photomultiplier tubes 11*a*, 11*b*, 11*c*, and 11*d* based on the signal light corresponding to the laser light with the predetermined intensity and the standard deviation $\sigma_{S>>H}$ of the digital values DN, and calculates the standard deviation this by further using the average value $A_{S>>H}$ and the standard deviation $\sigma_{S>>H}$ in the flow cytometer system 1. With such a configuration, it is possible to calculate the noise component of the virtual photon quantity of the signal light in consideration of the characteristics of the light source and the variations in the analysis target. As a result, the accuracy of the population identification of the analysis target can be further enhanced.

Figure 8:
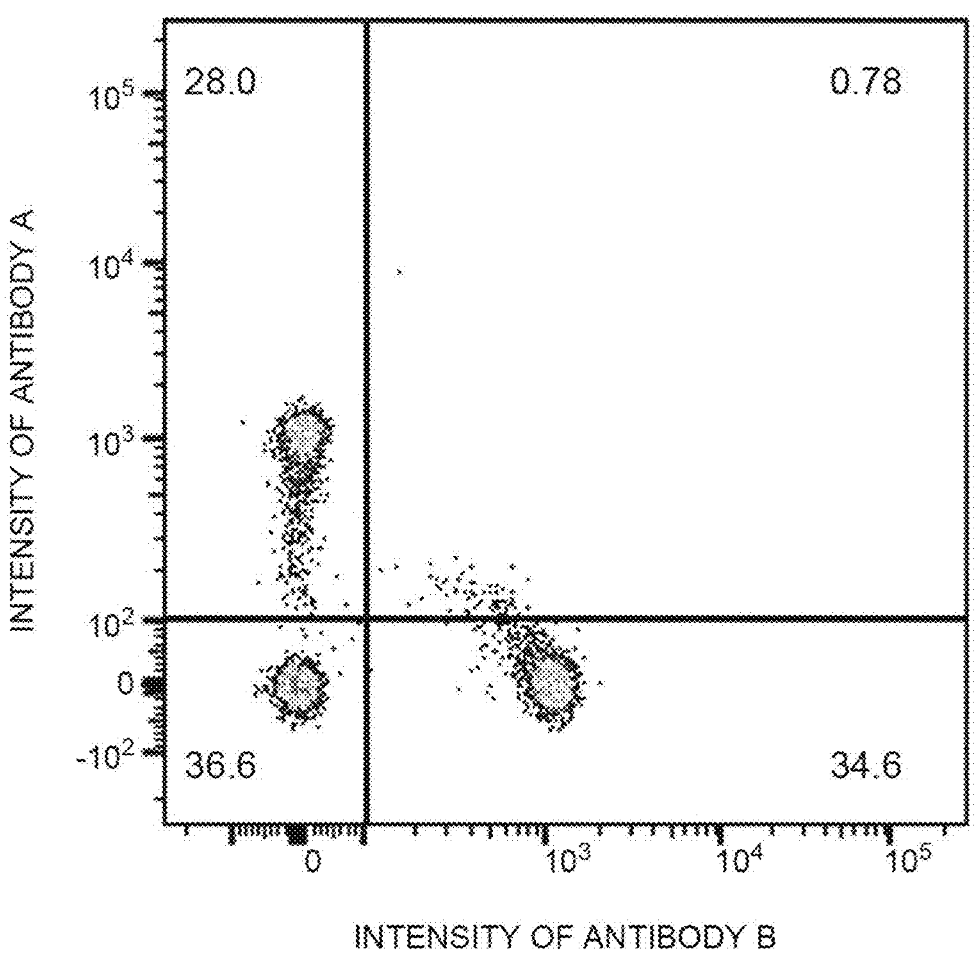
FIG. 8 is a graph illustrating an example of a dot plot generated and output in data analysis by conventional flow cytometry.
Figure 9:
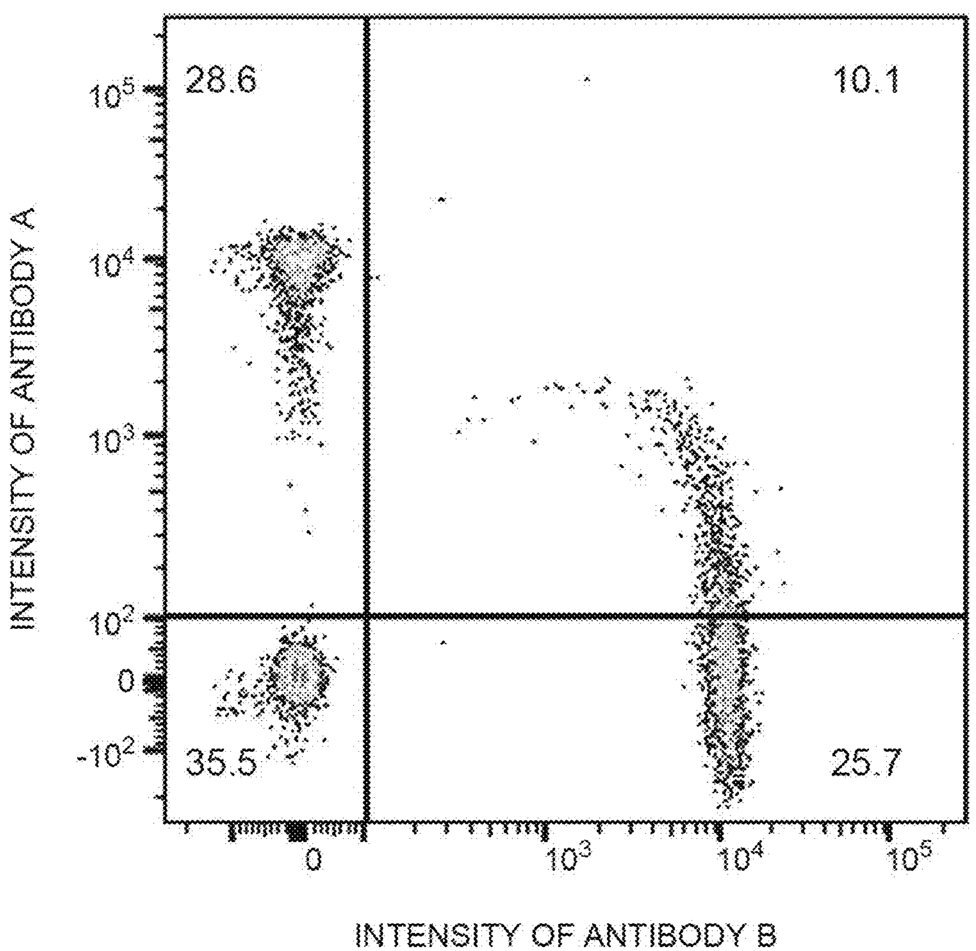
FIG. 9 is a graph illustrating an example of the dot plot generated and output in the data analysis by the conventional flow cytometry.

FIG. 8 is a graph illustrating an example of a dot plot generated and output by one system in data analysis by conventional flow cytometry, and FIG. 9 is a graph illustrating an example of a dot plot generated and output by another system in data analysis by conventional flow cytometry. As shown in the graphs, even when sample fluids including the same analyte are targeted, the ratio of the population by the data analysis is calculated differently between the two systems. For example, a ratio of positives for both antibodies A and B is calculated to be "0.78%" in one system and "10.1%" in another system, and the ratio calculated by both is calculated to significantly different values. This is due to variations in characteristics of the devices included in the system, variations in the degree of adjustment of the devices by an operator of the system, and the like. According to the present embodiment, it is possible to reliably reduce variations in analysis results due to such variations.

Although the embodiment of the present invention have been described above, the present invention is not limited to the above embodiments, and may be modified or applied to other objects without changing the gist described in each claim.

For example, the gating processing in the dot plot is not limited to automatic setting by the electronic system 4, and may be set by the operator's input, or one that is automatically set may be adjusted by the operator's input. In addition, the photomultiplier tube in the embodiment may be not only a photomultiplier tube including a dynode or an anode that is an electron collecting electrode, but also a hybrid photo detector (HPD) that multiplies and detects photoelectrons emitted from the photoelectric conversion unit by a semiconductor element.

In addition, as a first modification, the data processing device 12 may use an effective photoelectron quantity (photoelectron quantity) instead of the virtual photon quantity as the analysis evaluation value. In that case, theoretical models represented by the following Formulas (11) and (12) are applied as theoretical models of the intensity of the signal light and the noise.

[Formula 11]

$$A_s = A_o + C*G*(E_D + E_B + E_S) \tag{11}$$

[Formula 12]

$$\sigma_{this} = \sqrt{(\sigma_C)^2 + \left(C*\sqrt{F}*G*\sqrt{E_D+E_B}\right)^2 + \left(C*\sqrt{F}*G*\sqrt{E_S}\right)^2 + (C*\rho*G*E_S)^2} \tag{12}$$

In the first modification, similarly to the above embodiment, the calculation unit 202 calculates parameters $A_{ES=0}$ and $\sigma_{ES=0}$, the variation rate ρ, and the parameter F as an effective electron quantity expectation value $E_D$ of the dark current, an effective photoelectron quantity $E_B$ of the background light, and an effective photoelectron quantity expectation value ES, and stores the parameters in the internal storage medium. Then, when the detection of the sample fluid to be measured is started, the calculation unit 202 derives the effective photoelectron quantity $E_S$ from the average value $A_S$ of the intensity signals indicated by the digital values DN by calculating the following Formula (13) based on the acquired digital value DN.

[Formula 13]

$$E_s = \frac{A_s - \{A_0 + C*G*(E_D + E_B)\}}{C*G} = \frac{A_s - A_{ES=0}}{C*G} \tag{13}$$

Further, the calculation unit 202 calculates the standard deviation $\sigma_{this}$ by applying the calculated effective photoelectron quantity $E_S$, the stored parameters $\sigma_{ES=0}$ and F, and the variation rate $\rho$ to the following Formula (14).

[Formula 14]

$$\sigma_{this} = \sqrt{\left\{\sqrt{(\sigma_C)^2 + \left(C*\sqrt{F}*G*\sqrt{E_D+E_B}\right)^2}\right\}^2 + C^2*G^2*\left(F*Es+\rho^2*Es^2\right)} = \sqrt{\sigma_{ES=0}^2 + C^2*G^2*\left(F*Es+\rho^2*Es^2\right)} \tag{14}$$

Thereafter, the calculation unit 202 can convert the standard deviation $\sigma_{this}$ [DN rms] into a standard deviation $\sigma_{this}$ [e rms] obtained by converting the standard deviation $\sigma_{this}$ [DN rms] into the effective photoelectron quantity by dividing the standard deviation $\sigma_{this}$ by the conversion coefficient C and the gain G.

Also in the first modification, data analysis such as gating processing using the calculated effective photoelectron quantity $E_S$ and the standard deviation $\sigma_{this}$ becomes possible, the signal light can be quantitatively analyzed, and the variations in the analysis results by the flow cytometry can be reduced.

In addition, as a second modification, the data processing device 12 may calculate the average value of the intensity signals and the noise of the respective channels of the plurality of photomultiplier tubes 11*a*, 11*b*, 11*c*, and 11*d* by using another theoretical model as a theoretical model of the intensity of the signal light and the noise. For example, in the second modification, the intensities of fluorescence of a plurality of colors from a plurality of types of phosphors included in the analyte are measured by two photomultiplier tubes 11*c* and 11*d*, and data analysis processing is executed based on the digital values of the two channels of the photomultiplier tubes 11*c* and 11*d*. When the fluorescence of the plurality of colors is measured in two channels, fluorescence may leak from one channel to the other channel. Therefore, in the second modification, data analysis is executed by adopting a theoretical model in consideration of leakage of the fluorescence. Hereinafter, details of the data analysis processing by the data processing device 12 according to the second modification will be described together with the theoretical model.

In the data processing device 12, theoretical models represented by the following Formulas (15) and (16) are applied to an expectation value X [DN] of the intensity of the fluorescence in the first wavelength band from a staining phosphor U in the analyte corresponding to the channel (X axis) of the photomultiplier tube 11*c* and an expectation value Y [DN] of the intensity of the fluorescence in the second wavelength band from a staining phosphor V corresponding to the channel (Y axis) of the photomultiplier tube 11*d*.

[Formula 15]

$$X = X_o + CG_XQ_X\langle S_U\rangle + CG_XQ_XR_{V\to X}\langle S_V\rangle \pm \left\{\sqrt{(\sigma_{cX})^2 + \left(CG_X\sqrt{F_X}\sqrt{Q_X\langle S_U\rangle}\right)^2 + \left(CG_X\sqrt{F_X}\sqrt{Q_XR_{V\to X}\langle S_V\rangle}\right)^2 \mp \left(CG_XQ_X\rho_{U_1}\langle S_U\rangle\right)^2 + \left(CG_XQ_XR_{V\to X}\rho_{V_1}\langle S_V\rangle\right)^2}\right\} \pm \sqrt{(CG_X\widehat{Q_X\rho_{Ur}}\langle S_U\rangle)^2} \pm \sqrt{(CG_XQ_X\widehat{R_{V\to X}}\rho_{Vr}\langle S_V\rangle)^2} \tag{15}$$

[Formula 16]

$$Y = Y_o + CG_YQ_YR_{U\to Y}\langle S_U\rangle + CG_YQ_Y\langle S_V\rangle \pm \left\{\sqrt{(\sigma_{cY})^2 + \left(CG_Y\sqrt{F_Y}\sqrt{Q_YR_{U\to Y}\langle S_U\rangle}\right)^2 + \left(CG_Y\sqrt{F_Y}\sqrt{Q_Y\langle S_V\rangle}\right)^2 \mp \left(CG_YQ_YR_{U\to Y}\rho_{U_1}\langle S_U\rangle\right)^2 + \left(CG_YQ_Y\rho_{V_1}\langle S_V\rangle\right)^2}\right\} \pm \sqrt{(CG_YQ_Y\widehat{R_{U\to Y}}\rho_{Ur}\langle S_U\rangle)^2} \pm \sqrt{(CG_Y\widehat{Q_Y\rho_{Vr}}\langle S_V\rangle)^2} \tag{16}$$

In the above Formulas (15) and (16), $X_0$ is an offset [DN] including a dark current component and a background light component in the X axis, $Y_0$ is an offset [DN] including the dark current component and the background light component in the Y axis, $G_X$ is a gain [e/e] of the photomultiplier tube that outputs the intensity signal to the X axis, $G_Y$ is a gain [e/e] of the photomultiplier tube that outputs the intensity signal to the Y axis, $Q_X$ is photon-to-electron conversion efficiency [e/photon] of the photomultiplier tube that outputs the intensity signal to the X axis, $Q_Y$ is photon-to-electron conversion efficiency [e/photon] of the photomultiplier tube that outputs the intensity signal to the Y axis, $\langle S_U\rangle$ indicates an expectation value of the index according to the wavelength spectrum of the signal light emitted from the staining phosphor U and incident on the photomultiplier tube that outputs the intensity signal to the X axis (virtual photon quantity expectation value of signal light) [photon], $\langle S_V\rangle$ indicates an expectation value of the index according to the wavelength spectrum of the signal light emitted from the staining phosphor V and incident on the photomultiplier tube that outputs the intensity signal to the Y axis (virtual photon quantity expectation value of signal light) [photon], $R_{V\to X}$ indicates a ratio [photon/photon] at which signal light is emitted from the staining phosphor V and leaks into the photomultiplier tube that outputs the intensity signal to the X axis, $R_{U\to Y}$ indicates a ratio [photon/photon] at which signal light is emitted from the staining phosphor U and leaks into the photomultiplier tube that outputs the intensity signal to the Y axis.

Further, in the above Formulas (15) and (16), $\sigma_{cX}$ indicates readout noise (including noise generated by the circuit, and shot noise components of dark current and background light) [DN rms] in the intensity signal on the X axis, $\sigma_{cY}$ indicates readout noise (including noise generated by the circuit, and shot noise components of dark current and background light) [DN rms] in the intensity signal on the Y axis, $F_X$ indicates an excess noise coefficient of the photomultiplier tube that outputs the intensity signal to the X axis, $F_Y$ indicates an excess noise coefficient of the photomultiplier tube that outputs the intensity signal to the Y axis, $\rho_{Ui}$ indicates an (independent) variation degree in which the output of the photomultiplier tube that outputs the intensity signal to the X axis and the output of the photomultiplier tube that outputs the intensity signal to the Y axis do not affect each other in the measurement in which the staining phosphor U is involved, $\rho_{Ur}$ indicates a (correlation) variation degree in which the output of the photomultiplier tube that outputs the intensity signal to the X axis and the output of the photomultiplier tube that outputs the intensity signal to the Y axis affect each other in the measurement in which the staining phosphor U is involved, $\sigma_{Vi}$ indicates an (independent) variation degree in which the output of the photomultiplier tube that outputs the intensity signal to the X axis and the output of the photomultiplier tube that outputs the intensity signal to the Y axis do not affect each other in the measurement in which the staining phosphor V is involved, and $\rho_{Vr}$ indicates a (correlation) variation degree in which the output of the photomultiplier tube that outputs the intensity signal to the X axis and the output of the photomultiplier tube that outputs the intensity signal to the Y axis affect each other in the measurement in which the staining phosphor V is involved.

In the above Formulas (15) and (16), first to third terms on the right side indicate the average value [DN] of the intensity signals, and unlike the Formula (1), the influence of the dark current and the background light is included in the offset and evaluated. Furthermore, fourth and subsequent terms on the right side of Formula (15) represent the noise of the intensity signal, and unlike the Formula (2), the influence of the dark current and the background light is included in the circuit noise and evaluated. Of the noise of the intensity signal, a term in the following Formula;

$$(\sigma_{cX})^2 \quad \text{[Formula 17]}$$

indicates readout noise in an own channel. Of the noise of the intensity signal, a term in the following Formula;

$$\left(CG_x\sqrt{F_x}\sqrt{Q_X\langle S_U\rangle}\right)^2 \quad \text{[Formula 18]}$$

indicates shot noise in the own channel, and the term in the following Formula;

$$\left(CG_X\sqrt{F_X}\sqrt{Q_X R_{V\to X}\langle S_V\rangle}\right)^2 \quad \text{[Formula 19]}$$

indicates shot noise from the other channel.

Of the noise of the intensity signal, a term in the following Formula;

$$(CG_X Q_X \rho_{Ui}\langle S_U\rangle)^2 \quad \text{[Formula 20]}$$

indicates own independent system noise (depending on variations on the light source and sample side) caused by the signal light of the own channel reflecting the virtual photon quantity expectation value of the signal light to be detected in the own channel and the gain of the photomultiplier tube of the own channel. The independent system noise means noise of a component in which variations (degrees and directions) of the intensity signals of the two channels are independent from each other. In addition, of the noise of the intensity signal, a term in the following Formula;

$$(CG_X Q_X R_{V\to X}\rho_{Vi}\langle S_V\rangle)^2 \quad \text{[Formula 21]}$$

indicates another independent system noise (depending on variations on the light source and sample side) caused by the signal light of the other channel reflecting the virtual photon quantity expectation value of the signal light leaking into the photomultiplier tube of the own channel out of the signal light to be detected in the other channel and the gain of the photomultiplier tube of the own channel. Of the noise of the intensity signal, a term in the following Formula;

$$(CG_X\widehat{Q_X\rho_{Ur}}\langle S_U\rangle)^2 \quad \text{[Formula 22]}$$

indicates own correlation system noise (depending on variations on the light source and sample side) caused by a correlation between the signal light of the own channel and the signal light of the other channel reflecting the virtual photon quantity expectation value of the signal light to be detected in the own channel and the gain of the photomultiplier tube of the own channel. The correlation system noise means noise of a component in which variations (degrees and directions) of the intensity signals of two channels are correlated with each other. The notation of "^" in this Formula represents that it is correlation system noise caused by the correlation between the channels. Of the noise of the intensity signal, a term in the following Formula;

$$(CG_X Q_X\widehat{R_{V\to X}\rho_{Vr}}\langle S_V\rangle)^2 \quad \text{[Formula 23]}$$

indicates another correlation system noise (depending on variations on the light source and sample side) caused by the correlation between the signal light of the own channel and the signal light of the other channel reflecting the virtual photon quantity expectation value of the signal light to be detected in the other channel and the gain of the photomultiplier tube of the own channel. The notation of "^" in this Formula also represents that it is correlation system noise caused by the correlation between the channels. Similar noise terms are included in the fourth and subsequent terms on the right side of Formula (16).

Similarly to the above embodiment, the calculation unit 202 of the data processing device 12 acquires an intensity signal in a case where the signal light is not incident on the photomultiplier tube of each channel, an intensity signal in a case where the intensity of the signal light of each channel is sufficiently high, an intensity signal in a case where the intensity of the signal light of each channel is changed to high and low, and the like. Then, the calculation unit 202 calculates and stores each parameter in the above Formulas (15) and (16) with reference to the acquired intensity signals. At this time, the parameters of the terms other than the independent system noise and the correlation system noise can be calculated in the same manner as in the above-described embodiment, and the parameters of the terms of the independent system noise and the correlation system noise can be calculated by performing measurement in two channels in a state in which each phosphor is illuminated and making the intensity signals obtained as a result of the measurement simultaneous by the above-described Formulas (15) and (16). Furthermore, the calculation unit 202 can derive a virtual photon quantity (or an effective photoelectron quantity) of each channel and its standard deviation (first noise value) using the stored parameters based on the intensity signal output from each channel when the detection by the flow cytometry is started. The analysis unit 203 of the data processing device 12 can execute data analysis similar to the above embodiment using the virtual photon quantity (or the effective photoelectron quantity) and the standard deviation calculated by the calculation unit 202.

According to the second modification described above, it is possible to accurately predict the noise value in the analysis evaluation value due to the variation in the signal light of the detection target in the photomultiplier tube in the own channel. As a result, the signal light can be quantitatively analyzed by the data analysis. In particular, when the intensities of fluorescence of a plurality of colors are measured using a plurality of channels, the prediction accuracy of the noise value is improved. In addition, even in a case where monochromatic signal light is to be measured, the intensity signal includes variations caused by various factors (variation due to the hitting way of the laser light, variation in size of the analyte, variation in structure of the analyte, and the like) as described above. As in the present modification, by separately evaluating the independent system noise and the correlation system noise, it is possible to predict the noise by separating these factors. Furthermore, the factor of the noise can be evaluated separately, and the improvement can be effectively performed when the improvement (improvement of device, improvement of phosphor, or the like) for keeping the noise value small is performed. For example, when the component of the correlation system noise is evaluated to be 0.25, when it is known that the component of the correlation system noise of the variation due to the hitting way of the laser light is about 0.05, it can be presumed that the component of the variation due to the analyte is a problem at a considerable ratio. In this case, it can be presumed that the noise value can be effectively reduced by improving binding efficiency of the phosphor.

Furthermore, the data processing device 12 according to the second modification may perform signal correction processing called compensation on a signal intensity of one channel and a signal intensity of the other channel. The compensation is processing of subtracting the signal intensity leaking from the other channel from the signal intensity in one channel and performing correction so as to reflect only a signal light from a target phosphor.

The calculation unit 202 of the data processing device 12 executes the compensation as follows. That is, the calculation unit 202 converts an intensity signal X acquired in one channel by the following Formula;

$$Comp[X] = X - R'_{V\to X}Y \quad \text{[Formula 24]}$$

into a correction value Comp [X]. Here, a coefficient $R_{V\to x}'$ is a coefficient represented by the following Formula.

$$\frac{G_X Q_X}{G_Y Q_Y} R_{V\to X} = R'_{V\to X} \quad \text{[Formula 25]}$$

The coefficient $$R'_{V\to X}$$

can be acquired by performing detection by the flow cytometry only with the emission of the staining phosphor V and dividing the expectation value of the X-axis intensity signal by the expectation value of the Y-axis intensity signal. Thereafter, the calculation unit 202 can derive the correction value Comp [X] based on the intensity signal output from the X-axis channel when the detection by the flow cytometry is started.

Similarly, the calculation unit 202 converts an intensity signal Y acquired in the other channel by the following Formula;

$$Comp[Y] = Y - R'_{U\to Y}X \quad \text{[Formula 26]}$$

into a correction value Comp [Y]. Here, a coefficient $$R'_{U\to Y}$$

is a coefficient represented by the following Formula.

$$\frac{G_Y Q_Y}{G_X Q_X} R_{U\to Y} = R'_{U\to Y} \quad \text{[Formula 27]}$$

The coefficient $$R'_{U\to Y}$$

can be acquired by performing detection by the flow cytometry only with the emission of the staining phosphor U and dividing the expectation value of the Y-axis intensity signal by the expectation value of the X-axis intensity signal. Thereafter, the calculation unit 202 can derive the correction value Comp [Y] based on the intensity signal output from the Y-axis channel when the detection by the flow cytometry is started.

In a case where the intensity signal is corrected by the compensation, in the data processing device 12, theoretical models represented by the following Formulas (17) and (18) are applied with respect to the intensity signal Comp [X] and the intensity signal Comp [Y].

[Formula 28]

$$Comp[X] = X_o - \left(\frac{G_X Q_X}{G_Y Q_Y} R_{V\to X}\right) Y_o + (1 - R_{V\to X} R_{U\to Y}) C G_X Q_X \langle S_U \rangle \pm \left\{ \sqrt{ \begin{aligned} &(\sigma_{cX})^2 + \left(\frac{G_X Q_X}{G_Y Q_Y} R_{V\to X}\right)^2 (\sigma_{cY})^2 + \\ &\left\{ (G_X)^2 F_X Q_X (G_X R_{V\to X})^2 F_Y \frac{(Q_X)^2}{Q_Y} R_{U\to Y} \right\} \left(C\sqrt{\langle S_U \rangle}\right)^2 + \\ &\left\{ (G_X)^2 F_X Q_X R_{V\to X} (G_X R_{V\to X})^2 F_Y \frac{(Q_X)^2}{Q_Y} \right\} \left(C\sqrt{\langle S_V \rangle}\right)^2 + \\ &\left\{ (G_X Q_X)^2 + (G_X Q_X R_{V\to X} R_{U\to Y})^2 \right\} (C\rho_{U1}\langle S_U \rangle)^2 + \\ &\left\{ 2 (G_X Q_X R_{V\to X})^2 \right\} (C\rho_{V1}\langle S_V \rangle)^2 \end{aligned} } \right\} \pm \sqrt{ \{ G_X Q_X - G_X Q_X R_{V\to X} R_{U\to Y} \}^2 (C\rho_{Ur}\langle S_U \rangle)^2 } \tag{17}$$

[Formula 29]

$$Comp[Y] = Y_o - \left(\frac{G_Y Q_Y}{G_X Q_X} R_{U\to Y}\right) X_o + (1 - R_{V\to X} R_{U\to Y}) C G_Y Q_Y \langle S_V \rangle \pm \left\{ \sqrt{ \begin{aligned} &(\sigma_{cY})^2 + \left(\frac{G_Y Q_Y}{G_X Q_X} R_{U\to Y}\right)^2 (\sigma_{cX})^2 + \\ &\left\{ (G_Y)^2 F_Y Q_Y + (G_Y R_{U\to Y})^2 F_X \frac{(Q_Y)^2}{Q_X} \right\} \left(C\sqrt{\langle S_U \rangle}\right)^2 + \\ &\left\{ (G_Y)^2 F_Y Q_Y + (G_Y R_{U\to Y})^2 F_X \frac{(Q_Y)^2}{Q_X} R_{V\to X} \right\} \left(C\sqrt{\langle S_V \rangle}\right)^2 \\ &\left\{ 2 (G_Y Q_Y R_{U\to Y})^2 \right\} (C\rho_{U1}\langle S_U \rangle)^2 \\ &\left\{ (G_Y Q_Y)^2 + (G_Y Q_Y R_{V\to X} R_{U\to Y})^2 \right\} (C\rho_{V1}\langle S_V \rangle)^2 \end{aligned} } \right\} \pm \sqrt{ \{ G_Y Q_Y - G_Y Q_Y R_{V\to X} R_{U\to Y} \}^2 (C\rho_{Vr}\langle S_V \rangle)^2 } \tag{18}$$

In the above Formulas (17) and (18), first to third terms on the right side indicate the average value [DN] of the intensity signals, and fourth and subsequent terms on the right side represent the noise of the intensity signal. Of the noise of the above Formula (17), a term in the following Formula;

$$(\sigma_{cX})^2 \quad \text{[Formula 30]}$$

indicates readout noise in an own channel, and a term in the following Formula;

$$\left(\frac{G_X Q_X}{G_Y Q_y} R_{V\to X}\right)^2 (\sigma_{cY})^2 \quad \text{[Formula 31]}$$

indicates readout noise in the other channel. Further, of the noise of the above Formula (17), a term in the following Formula;

$$\left\{ (G_X)^2 F_X Q_X + (G_X R_{V\to X})^2 F_Y \frac{(Q_X)^2}{Q_Y} R_{U\to Y} \right\} \left(C\sqrt{\langle S_U \rangle}\right)^2 \quad \text{[Formula 32]}$$

indicates shot noise in the own channel, and a term in the following Formula;

$$\left\{ (G_X)^2 F_X Q_X R_{V\to X} + (G_X R_{V\to X})^2 F_Y \frac{(Q_x)^2}{Q_Y} \right\} \left(C\sqrt{\langle S_V \rangle}\right)^2 \quad \text{[Formula 33]}$$

indicates shot noise from the other channel.

Of the noise in the above intensity signal, a term in the following Formula;

$$\{ (G_X Q_X)^2 + (G_X Q_X R_{V\to X} R_{U\to Y})^2 \} (C\rho_{Ui}\langle S_U \rangle)^2 \quad \text{[Formula 34]}$$

is own independent system noise, a term in the following Formula;

$$\{ 2 (G_X Q_X R_{V\to X})^2 \} (C\rho_{Vi}\langle S_v \rangle)^2 \quad \text{[Formula 35]}$$

is another independent system noise, and a term in the following Formula;

$$\{ G_X Q_X - G_X Q_X R_{V\to X} R_{U\to Y} \}^2 (C\rho_{Ur}\langle S_U \rangle)^2 \quad \text{[Formula 36]}$$

is own correlation system noise. Unlike the theoretical model of Formula (15), the theoretical model of Formula (17) includes the readout noise in the other channel, but does not include another correlation system noise. This reflects that the readout noise of the other channel is mixed in the correction value by the compensation, and the another correlation system noise is canceled by the compensation. Similar independent system noise and correlation system noise are included in the noise of the above Formula (18).

The calculation unit 202 of the data processing device 12 can derive a virtual photon quantity (or an effective photoelectron quantity) of each channel and its standard deviation by applying the theoretical models represented by the above Formulas (17) and (18).

Figure 10:
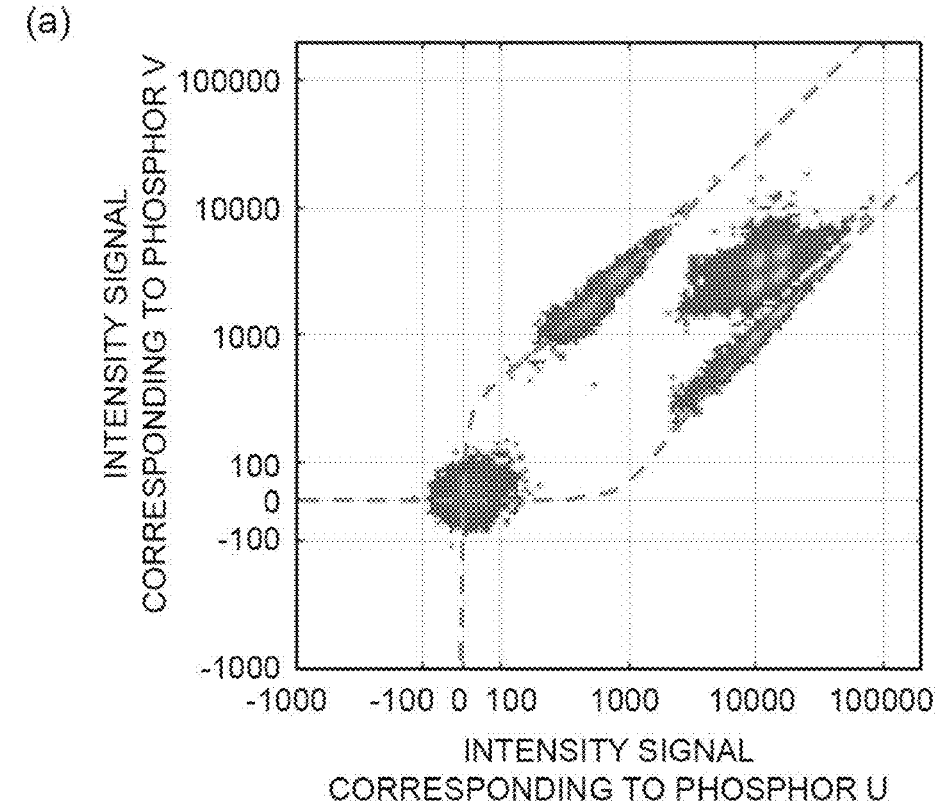
FIG. 10 is a graph illustrating an example of a dot plot generated and output by data analysis according to a second modification.
Figure 10:
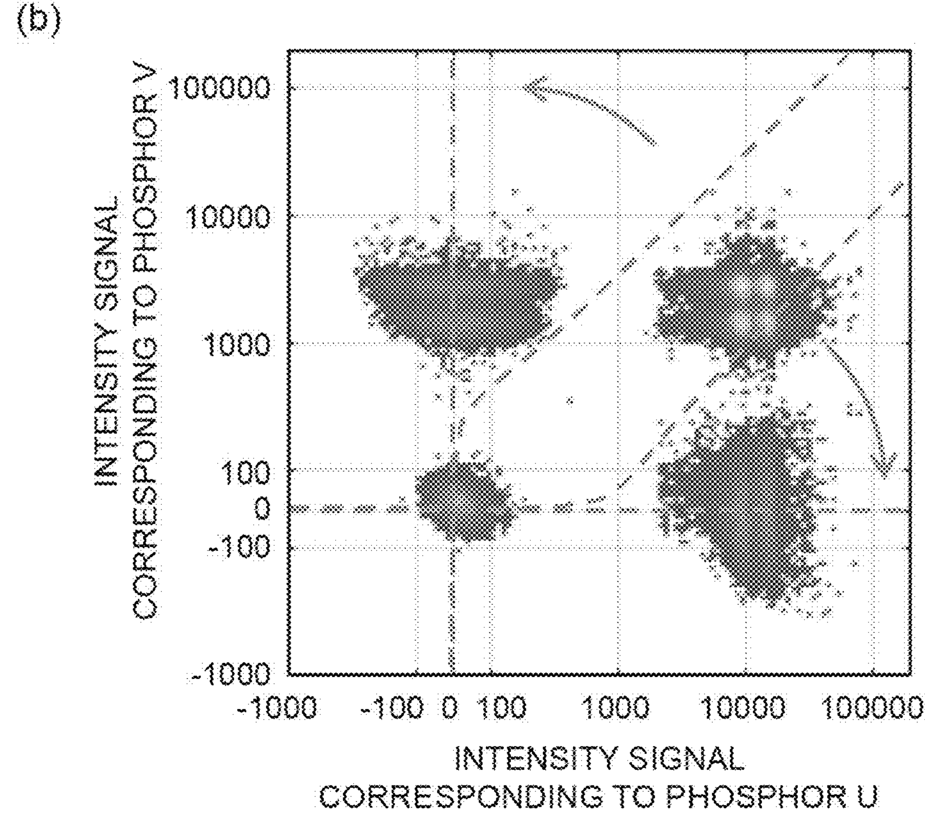

FIG. 10 is a graph illustrating an example of a dot plot generated and output by data analysis by the analysis unit 203, in which (a) illustrates a graph in a case where compensation is not executed and (b) illustrates a graph in a case where compensation is executed. In each graph, a relationship between the intensity signal of the channel (X axis) corresponding to the fluorescence from the staining phosphor U and the intensity signal of the channel (Y axis) corresponding to the fluorescence from the staining phosphor V is plotted. As described above, data distribution concentrated in one place when the compensation is not executed is corrected so that a distribution area is widened by the compensation, and it can be seen that the distribution excluding the influence of the leakage of light between the channels can be evaluated.

In addition, an evaluation example of the accuracy of the standard deviation of the intensity signals derived by the data processing device 12 according to the second modification will be described. In two measurements for the sample fluid of the analyte, the data processing device 12 derived the standard deviation from the intensity signals using the theoretical model obtained by excluding the term of the independent system noise from the above Formulas (17) and (18), and the standard deviations in the respective measurements were 30.1 and 338. These values has large errors with respect to the actual standard deviations of 90.8 and 962 calculated from the dot plots based on the respective measurements. On the other hand, when the standard deviation was derived using the theoretical models of the above Formulas (17) and (18), the standard deviations were 93.4 and 937, respectively, and it was found that the error was suppressed to be small.

In the data processing device 12 according to the embodiment, the first modification, and the second modification described above, the acquired intensity signal is converted into a photon quantity. The gain of the intensity signal of each channel changes for each individual difference of the photomultiplier tube of each channel or each detection condition of each channel. As a result, even when the characteristics of the filters included in the optical system 3 are uniform, in a case where the values of the intensity signals of the plurality of channels for measuring the light in the plurality of wavelength bands are evaluated as they are, the spectrum shapes are acquired separately due to the individual differences of the photomultiplier tubes, detection conditions, or the like. On the other hand, in the data processing device 12 according to the embodiment, the first modification, and the second modification described above, the intensity signal of each channel can be converted into a photon quantity, normalized, and evaluated, and the spectrum shape can be accurately evaluated regardless of the individual difference of the photomultiplier tube of each channel, the detection condition of each channel, or the like.

The data processing device 12 according to a third modification may be configured to be able to execute the following data analysis. That is, the calculation unit 202 calculates an analysis evaluation value such as a virtual photon quantity and its standard deviation (first noise value) based on data of an intensity signal obtained by measurement for a new unknown analyte. Then, the analysis unit 203 can process a set of data of the analysis evaluation value and the standard deviation for each data by using machine learning or by using an optimization algorithm, or use in evaluation processing of the reliability of the measurement result. Specifically, the analysis unit 203 uses a weighted least squares method as the machine learning or the optimization algorithm. As a result, weighting can be performed on the data points, and by using the reciprocal of the standard deviation as the weight of the analysis evaluation value, estimation processing according to validity calculated according to the theoretical model can be performed. Here, as the machine learning or the optimization algorithm, in addition to the weighted least squares method, the analysis unit 203 may use one that performs regularization, one that uses Bayesian statistics, a kernel method, a vector machine, a decision tree, a neural network, a cluster link, or the like.

In the first aspect and the second aspect of the embodiment, the analysis evaluation value is preferably the photon quantity. In this case, it is possible to further reduce the variations in the analysis results by the flow cytometry among the devices.

Furthermore, in the first aspect and the second aspect, the data analysis preferably includes gating processing of defining a boundary of a population to be analyzed. As a result, the gating processing can be performed based on the quantitative intensity information of the signal light, and the accuracy of the population identification of the analysis target can be enhanced.

Furthermore, in the first aspect, it is also preferable that the first noise value corresponding to the noise included in the analysis evaluation value is further calculated based on the analysis evaluation value and the gain of the photomultiplier tube, and in the gating processing, the section of the gate is set using the analysis evaluation value and the first noise value. Furthermore, in the second aspect, it is also preferable that the processor further calculates the first noise value corresponding to the noise included in the analysis evaluation value based on the analysis evaluation value and the gain of the photomultiplier tube, and in the gating processing, the section of the gate is set using the analysis evaluation value and the first noise value. In this case, a value corresponding to noise included in the photon quantity is calculated from the calculated photon quantity of the signal light, and the section of the gate is set using the value in the gating processing. As a result, the accuracy of the population identification of the analysis target can be further enhanced.

Furthermore, in the first aspect, it is also preferable that the average value of the second current signals, which are the output current signals of the photomultiplier tube in a case where there is no incidence of signal light in the flow cytometer, is acquired as the first average value, and the analysis evaluation value is calculated using the value of the first current signal obtained by subtracting the first average value. Furthermore, in the second aspect, it is also preferable that the processor acquires, as the first average value, the average value of the second current signals that are the output current signals of the photomultiplier tube in a case where there is no incidence of signal light in the flow cytometer, and calculates the analysis evaluation value using the value of the first current signal obtained by subtracting the first average value. In this way, the photon quantity of the signal light can be calculated excluding the influence of the background light and the dark current. As a result, the reliability of the analysis result by the flow cytometry can be enhanced.

Furthermore, in the first aspect, it is also preferable that the noise value of the second current signal, which is the output current signal of the photomultiplier tube in a case where there is no incidence of signal light in the flow cytometer, is acquired as the second noise value, and the first noise value is calculated by further using the second noise value. Furthermore, in the second aspect, it is also preferable that the processor acquires, as the second noise value, the noise value of the second current signal that is the output current signal of the photomultiplier tube in a case where there is no incidence of signal light in the flow cytometer, and calculates the first noise value by further using the second noise value. In this way, the noise component of the photon quantity of the signal light can be calculated in consideration of the influence of the background light and the dark current. As a result, the accuracy of the population identification of the analysis target can be further enhanced.

In addition, in the first aspect, it is also preferable that a second average value which is an average value of third current signals which are output current signals of the photomultiplier tube based on signal light according to excitation light with a predetermined intensity in the flow cytometer and a third noise value which is a noise value of the third current signal are acquired, and the first noise value is calculated by further using the second average value and the third noise value. In addition, in the second aspect, it is also preferable that the processor acquires the second average value which is the average value of the third current signals which are output current signals of the photomultiplier tube based on signal light corresponding to excitation light with a predetermined intensity in the flow cytometer and the third noise value which is the noise value of the third current signal, and calculates the first noise value by further using the second average value and the third noise value. With such a configuration, it is possible to calculate the noise component of the photon quantity of the signal light in consideration of the characteristics of the light source and variations in the analysis target. As a result, the accuracy of the population identification of the analysis target can be further enhanced.

Furthermore, in the first aspect, it is also preferable to further calculate a first noise value including: own independent system noise caused by own signal light reflecting an expectation value of signal light to be detected in the photomultiplier tube and a gain of the photomultiplier tube, another independent system noise caused by another signal light reflecting an expectation value of signal light leaking into the photomultiplier tube out of signal light to be detected in another photomultiplier tube different from the photomultiplier tube and the gain of the photomultiplier tube, and own correlation system noise caused by a correlation between the own signal light and the another signal light reflecting the expectation value of the signal light to be detected in the photomultiplier tube and the gain of the photomultiplier tube, and execute data analysis using the analysis evaluation value and the first noise value. Furthermore, in the second aspect, it is also preferable that the processor further calculates a first noise value including: own independent system noise caused by own signal light reflecting an expectation value of signal light to be detected in the photomultiplier tube and a gain of the photomultiplier tube; another independent system noise caused by another signal light reflecting an expectation value of signal light leaking into the photomultiplier tube out of signal light to be detected in another photomultiplier tube different from the photomultiplier tube and the gain of the photomultiplier tube; and own correlation system noise caused by a correlation between the own signal light and the another signal light reflecting the expectation value of the signal light to be detected in the photomultiplier tube and the gain of the photomultiplier tube, and executes data analysis using the analysis evaluation value and the first noise value. With such a configuration, it is possible to accurately predict the noise value in the analysis evaluation value caused by the variation in the signal light of the detection target of the photomultiplier tube. As a result, the signal light can be quantitatively analyzed by the data analysis.

Furthermore, in the first aspect, it is also preferable to calculate the first noise value further including another correlation system noise caused by the correlation between the own signal light and the another signal light, reflecting the expectation value of the signal light to be detected in the another photomultiplier tube and the gain of the photomultiplier tube. Furthermore, in the second aspect, it is also preferable that the processor calculates the first noise value further including another correlation system noise caused by the correlation between the own signal light and the another signal light reflecting the expectation value of the signal light to be detected in the another photomultiplier tube and the gain of the photomultiplier tube. In this case, it is possible to accurately predict the noise value in the analysis evaluation value caused by the variation in the signal light of the detection target of the photomultiplier tube.

Furthermore, in the first aspect, it is also preferable to further calculate a first noise value corresponding to noise included in the analysis evaluation value based on the analysis evaluation value and the gain of the photomultiplier tube, and execute data analysis by the optimization algorithm using the analysis evaluation value and the first noise value. Furthermore, in the second aspect, it is also preferable that the processor further calculates the first noise value corresponding to the noise included in the analysis evaluation value based on the analysis evaluation value and the gain of the photomultiplier tube, and executes data analysis by the optimization algorithm using the analysis evaluation value and the first noise value. In this case, data analysis can be performed while applying processing reflecting a noise value such as weighting to the analysis evaluation value as a target. As a result, the analysis result by the flow cytometry can be used while reflecting the reliability.

REFERENCE SIGNS LIST

- 1 Flow cytometer system
- 2 Fluid system
- 3 Optical system
- 4 Electronic system (signal processing device)
- 5 Channel
- 6 Flow cell
- 7 Laser light source
- 8 Lens
- **9*a*, 9*b*, 9*c*, 9*d*** Filter
- **10*b*, 10*c*** Dichroic mirror
- **11*a*, 11*b*, 11*c*, 11*d*** Photomultiplier tube
- 12 Data processing device
- 201 Signal acquisition unit
- 202 Calculation unit
- 203 Analysis unit

The invention claimed is:

1. A signal processing method for processing an output of a photomultiplier tube configuring a flow cytometer, the signal processing method comprising:
acquiring an output current signal of the photomultiplier tube based on signal light generated by flow cytometry using the flow cytometer as a first current signal;
calculating an analysis evaluation value that is either a photon quantity of the signal light incident on the photomultiplier tube or a photoelectron quantity emitted from a photoelectric conversion unit of the photomultiplier tube by dividing a value of the first current signal by a gain of the photomultiplier tube;
executing data analysis based on the analysis evaluation value; and
further calculating a first noise value corresponding to noise included in the analysis evaluation value based on the analysis evaluation value and the gain of the photomultiplier tube, wherein the data analysis includes gating processing in which a section of a gate is set using the analysis evaluation value and the first noise value.

2. The signal processing method according to claim 1, wherein
the analysis evaluation value is the photon quantity.

3. The signal processing method according to claim 1, further comprising:
acquiring, as a first average value, an average value of second current signals that are output current signals of the photomultiplier tube in a case where there is no incidence of the signal light in the flow cytometer; and
calculating the analysis evaluation value using the value of the first current signal obtained by subtracting the first average value.

4. The signal processing method according to claim 1, further comprising:
acquiring, as a second noise value, a noise value of a second current signal that is an output current signal of the photomultiplier tube in a case where there is no incidence of the signal light in the flow cytometer; and calculating the first noise value by further using the second noise value.

5. The signal processing method according to claim 1, further comprising:

acquiring, in the flow cytometer, a second average value that is an average value of third current signals that are output current signals of the photomultiplier tube based on the signal light corresponding to excitation light with a predetermined intensity and a third noise value that is a noise value of the third current signal; and calculating the first noise value by further using the second average value and the third noise value.

6. The signal processing method according to claim 1, further comprising:

further calculating a first noise value corresponding to noise included in the analysis evaluation value based on the analysis evaluation value and the gain of the photomultiplier tube, and executing data analysis by an optimization algorithm using the analysis evaluation value and the first noise value.

7. A signal processing method for processing an output of a photomultiplier tube configuring a flow cytometer, the signal processing method comprising:

acquiring an output current signal of the photomultiplier tube based on signal light generated by flow cytometry using the flow cytometer as a first current signal;

calculating an analysis evaluation value that is either a photon quantity of the signal light incident on the photomultiplier tube or a photoelectron quantity emitted from a photoelectric conversion unit of the photomultiplier tube by dividing a value of the first current signal by a gain of the photomultiplier tube;

further calculating a first noise value including: own independent system noise caused by own signal light reflecting an expectation value of signal light to be detected in the photomultiplier tube and a gain of the photomultiplier tube; another independent system noise caused by another signal light reflecting an expectation value of signal light leaking into the photomultiplier tube out of signal light to be detected in another photomultiplier tube different from the photomultiplier tube and the gain of the photomultiplier tube; and own correlation system noise caused by a correlation between the own signal light and the another signal light reflecting the expectation value of the signal light to be detected in the photomultiplier tube and the gain of the photomultiplier tube; and executing data analysis using the analysis evaluation value and the first noise value.

8. The signal processing method according to claim 7, further comprising:

calculating the first noise value further including another correlation system noise caused by the correlation between the own signal light and the another signal light, the correlation system noise reflecting an expectation value of the signal light to be detected in the another photomultiplier tube and the gain of the photomultiplier tube.

9. A signal processing device that processes an output of a photomultiplier tube configuring a flow cytometer and includes a processor, wherein the processor is configured to:

acquire an output current signal of the photomultiplier tube based on signal light generated by flow cytometry using the flow cytometer as a first current signal, calculate an analysis evaluation value that is either a photon quantity of the signal light incident on the photomultiplier tube or a photoelectron quantity emitted from a photoelectric conversion unit of the photomultiplier tube by dividing a value of the first current signal by a gain of the photomultiplier tube, execute data analysis based on the analysis evaluation value, and further calculate a first noise value corresponding to noise included in the analysis evaluation value based on the analysis evaluation value and the gain of the photomultiplier tube, wherein the data analysis includes gating processing in which a section of a gate is set using the analysis evaluation value and the first noise value.

10. The signal processing device according to claim 9, wherein the analysis evaluation value is the photon quantity.

11. The signal processing device according to claim 9, wherein the processor is configured to:

acquire, as a first average value, an average value of second current signals that are output current signals of the photomultiplier tube in a case where there is no incidence of the signal light in the flow cytometer, and calculate the analysis evaluation value using a value of the first current signal obtained by subtracting the first average value.

12. The signal processing device according to claim 9, wherein the processor is configured to:

acquire, as a second noise value, a noise value of a second current signal that is an output current signal of the photomultiplier tube in a case where there is no incidence of the signal light in the flow cytometer, and calculate the first noise value by further using the second noise value.

13. The signal processing device according to claim 9, wherein the processor is configured to:

acquire, in the flow cytometer, a second average value that is an average value of third current signals that are output current signals of the photomultiplier tube based on the signal light corresponding to excitation light with a predetermined intensity and a third noise value that is a noise value of the third current signal, and calculate the first noise value by further using the second average value and the third noise value.

14. The signal processing device according to claim 9, wherein the processor is configured to:

further calculate a first noise value corresponding to noise included in the analysis evaluation value based on the analysis evaluation value and the gain of the photomultiplier tube, and execute data analysis by an optimization algorithm using the analysis evaluation value and the first noise value.

15. A signal processing system comprising:

the signal processing device according to claim 9;

the photomultiplier tube; and an optical system that guides the signal light to the photomultiplier tube.

16. A signal processing device that processes an output of a photomultiplier tube configuring a flow cytometer and includes a processor, wherein the processor is configured to:

acquire an output current signal of the photomultiplier tube based on signal light generated by flow cytometry using the flow cytometer as a first current signal, calculate an analysis evaluation value that is either a photon quantity of the signal light incident on the photomultiplier tube or a photoelectron quantity emitted from a photoelectric conversion unit of the photomultiplier tube by dividing a value of the first current signal by a gain of the photomultiplier tube, further calculate a first noise value including: own independent system noise caused by own signal light reflecting an expectation value of signal light to be detected in the photomultiplier tube and a gain of the photomultiplier tube; another independent system noise caused by another signal light reflecting an expectation value of signal light leaking into the photomultiplier tube out of signal light to be detected in another photomultiplier tube different from the photomultiplier tube and the gain of the photomultiplier tube; and own correlation system noise caused by a correlation between the own signal light and the another signal light reflecting the expectation value of the signal light to be detected in the photomultiplier tube and the gain of the photomultiplier tube, and execute data analysis using the analysis evaluation value and the first noise value.

17. The signal processing device according to claim 16, wherein the processor is configured to:

calculate the first noise value further including another correlation system noise caused by the correlation between the own signal light and the another signal light, the correlation system noise reflecting an expectation value of the signal light to be detected in the another photomultiplier tube and the gain of the photomultiplier tube.

* * * * *